(12) United States Patent
Yoshimoto

(10) Patent No.: US 7,586,768 B2
(45) Date of Patent: Sep. 8, 2009

(54) ELECTRIC POWER CONVERSION APPARATUS FOR PLURAL DC VOLTAGE SOURCES AND AN AC ELECTRICAL LOAD

(75) Inventor: Kantaro Yoshimoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 262 days.

(21) Appl. No.: 11/641,938

(22) Filed: Dec. 20, 2006

(65) Prior Publication Data

US 2007/0194746 A1 Aug. 23, 2007

(30) Foreign Application Priority Data

Dec. 26, 2005 (JP) ............... 2005-371990

(51) Int. Cl.
*H02M 7/5387* (2007.01)
(52) U.S. Cl. .................. 363/71; 363/98; 363/132; 307/75; 307/80
(58) Field of Classification Search .......... 307/43, 307/75, 80, 81; 363/43, 71, 98, 132, 142
See application file for complete search history.

(56) References Cited

U.S. PATENT DOCUMENTS

| | | | | |
|---|---|---|---|---|
| 3,579,081 A | * | 5/1971 | Bates | ............ 363/43 |
| 3,775,662 A | * | 11/1973 | Compoly et al. | ............ 363/43 |
| 3,867,643 A | * | 2/1975 | Baker et al. | ............ 307/151 |
| 4,203,151 A | * | 5/1980 | Baker | ............ 363/43 |
| 4,270,163 A | * | 5/1981 | Baker | ............ 363/43 |
| 5,841,645 A | * | 11/1998 | Sato | ............ 363/43 |
| 6,005,787 A | * | 12/1999 | Mizukoshi | ............ 363/71 |
| 6,920,948 B2 | | 7/2005 | Sugiura et al. | |
| 6,969,967 B2 | * | 11/2005 | Su | ............ 318/801 |
| 7,049,777 B2 | * | 5/2006 | Suzuki | ............ 318/599 |

FOREIGN PATENT DOCUMENTS

JP 2002-118981 A 4/2002

* cited by examiner

*Primary Examiner*—Jeffrey L Sterrett
(74) *Attorney, Agent, or Firm*—Foley & Lardner LLP

(57) ABSTRACT

An electric power conversion apparatus includes a power converter connected to at least a first DC voltage source, a second DC voltage source and an AC electric motor. A control unit controls the power converter to generate a first PWM pulse train for supplying a first output voltage pulse train from the first DC voltage source to the AC electric motor and a second PWM pulse train for supplying a second output voltage pulse train from the second DC voltage source to the load in such a manner to form a pulse continuous in time in a final output voltage at least from each pulse of the first output voltage pulse train and a subsequent pulse of the second output voltage pulse train. A current path is provided constantly from the AC electric motor to at least one of the DC voltage sources.

16 Claims, 26 Drawing Sheets

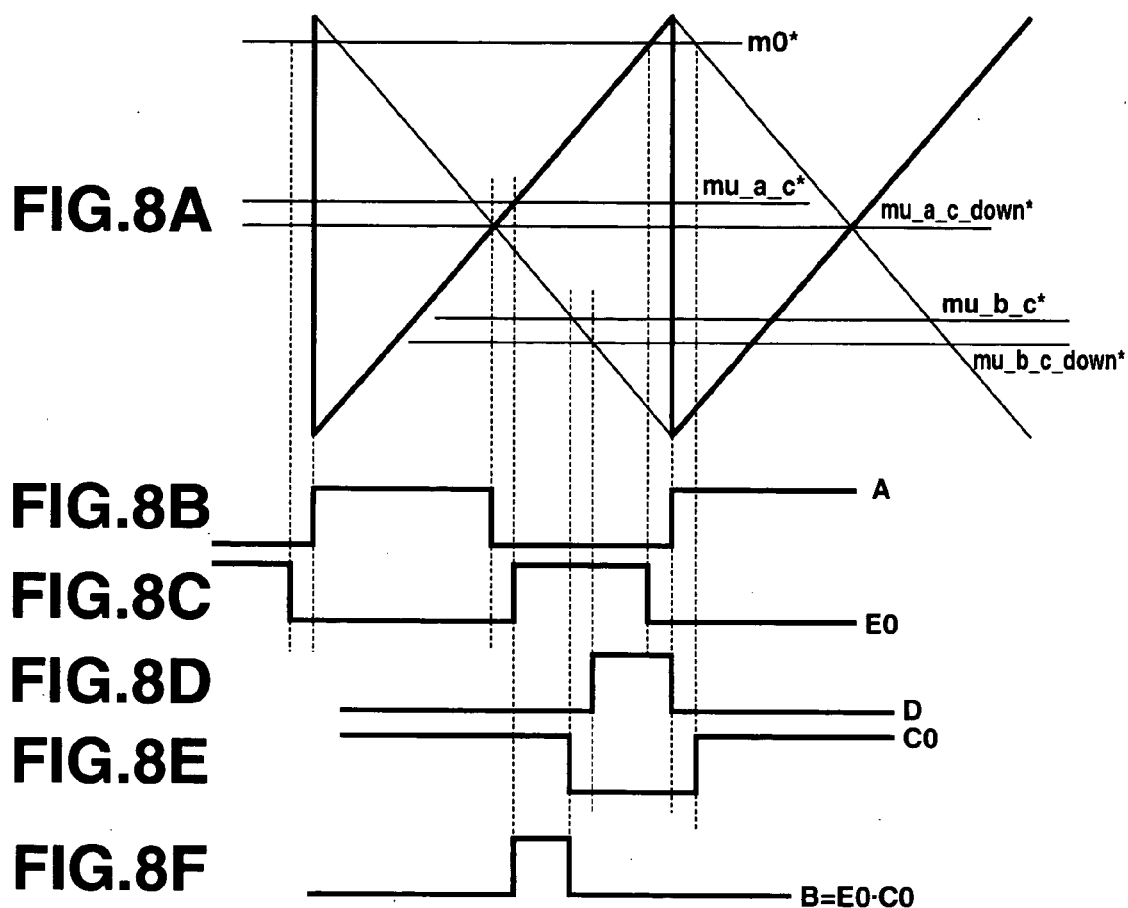
FIG.9
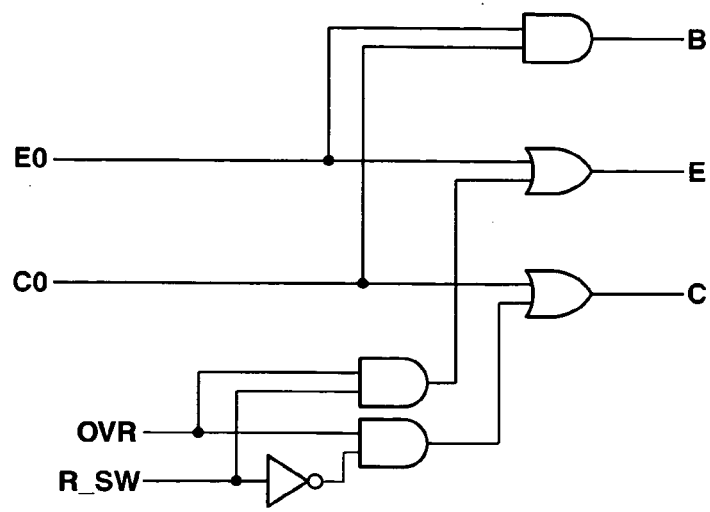

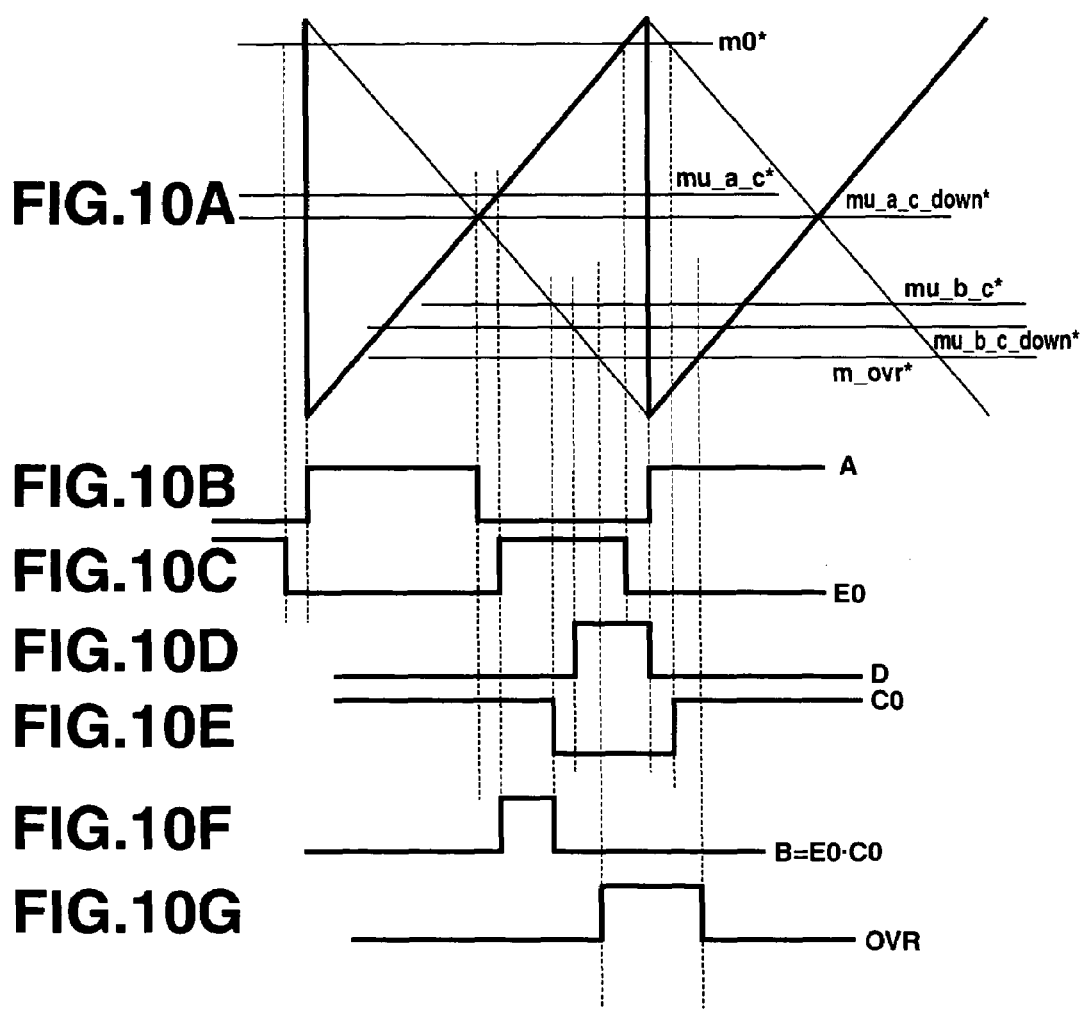

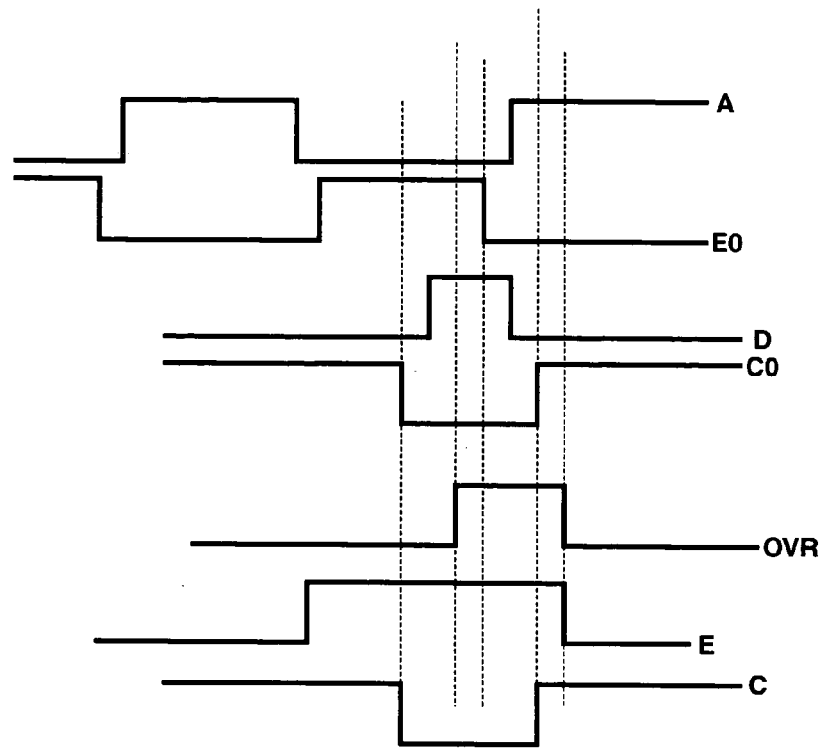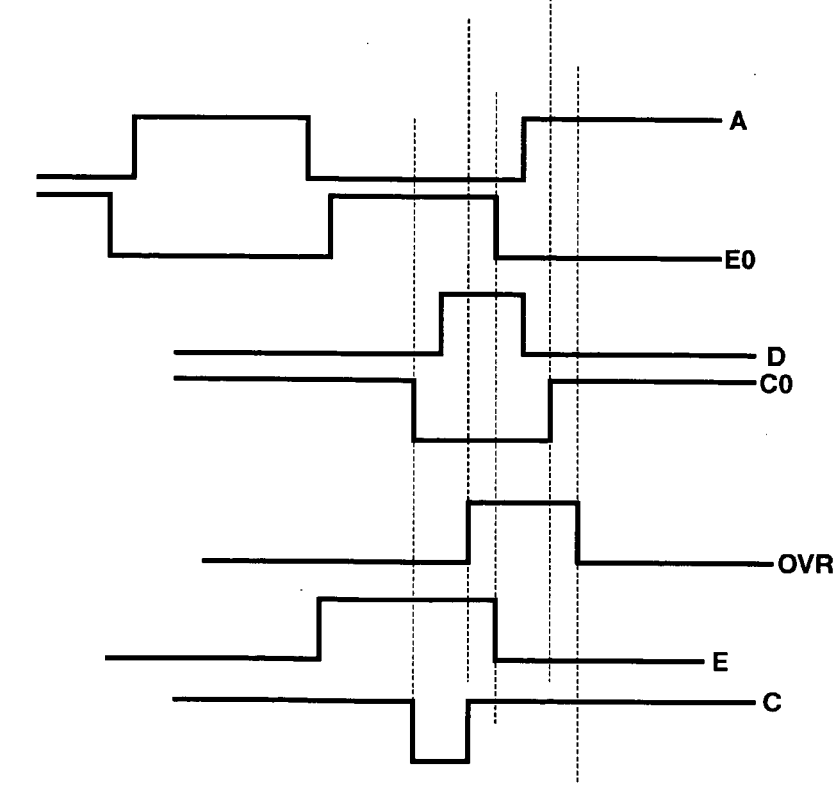

FIG.18
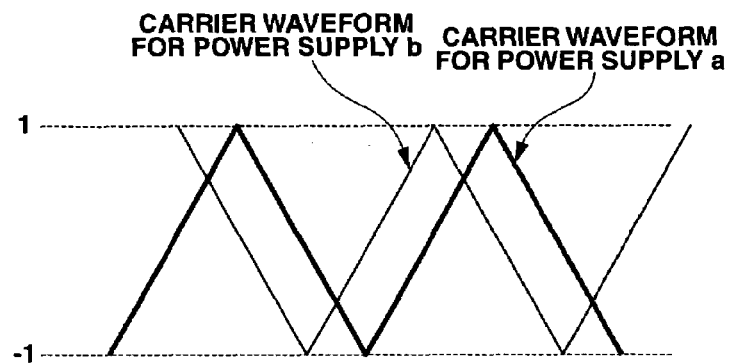
FIG.19A
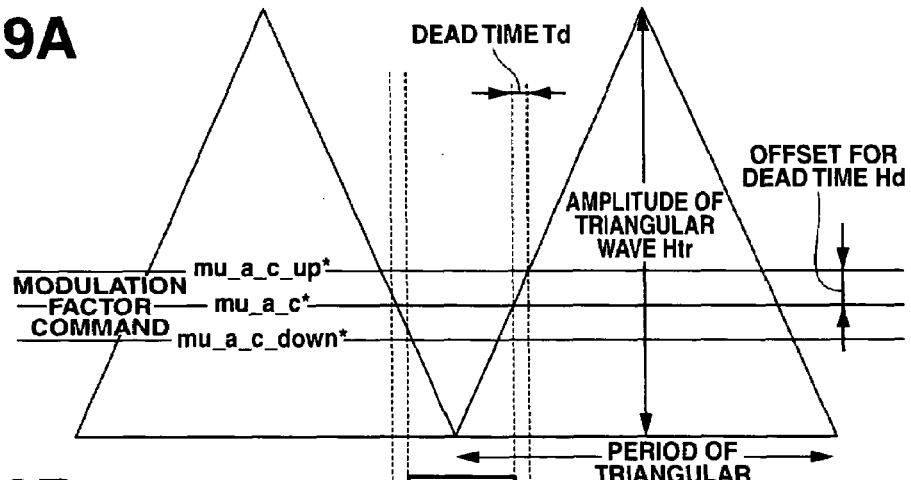
FIG.19B
FIG.19C
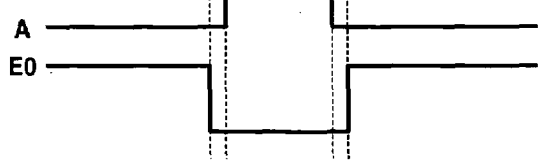

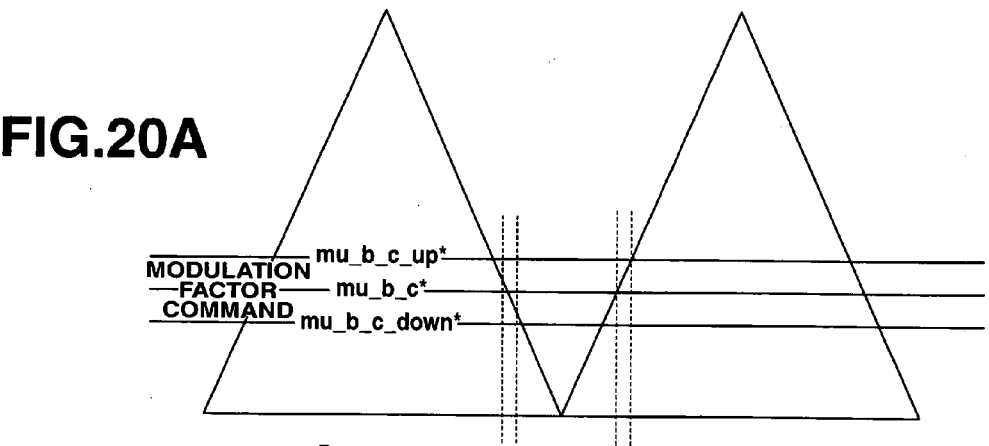
FIG.20A
FIG.20B
FIG.20C
FIG.21
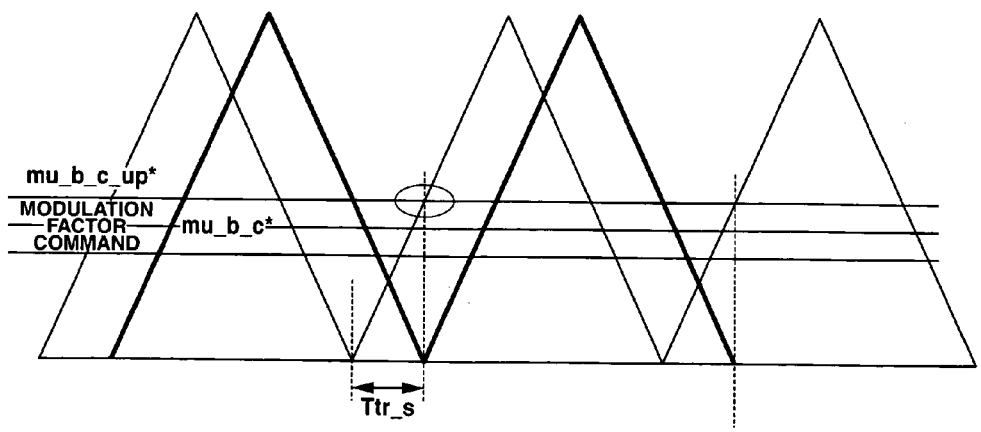

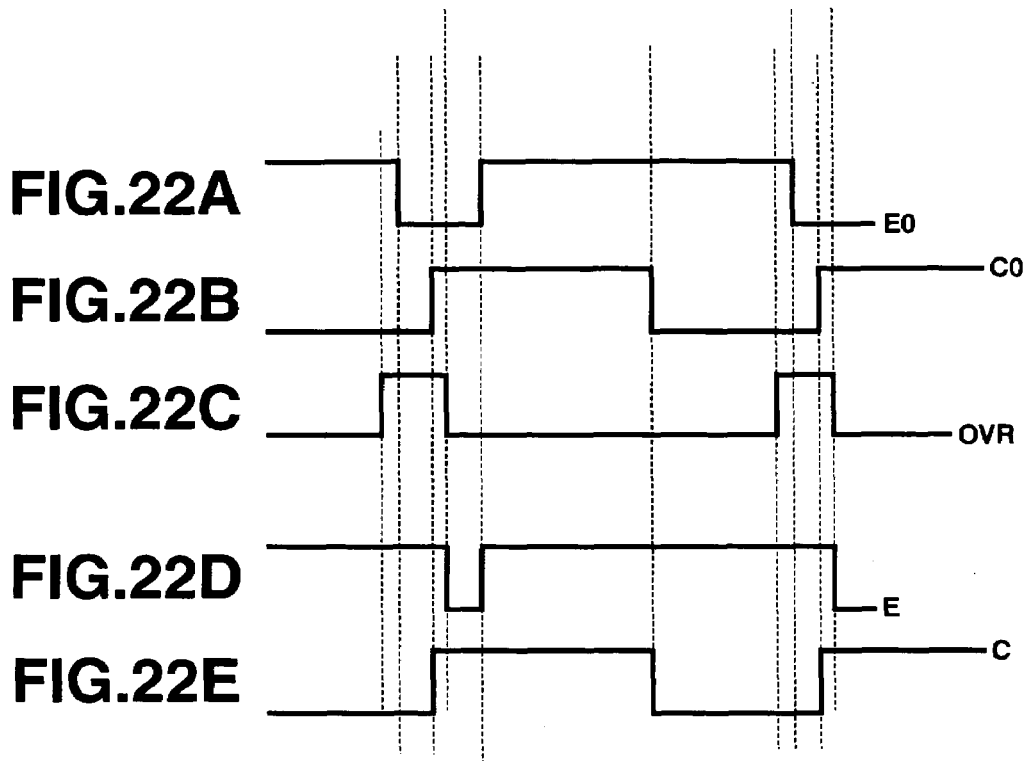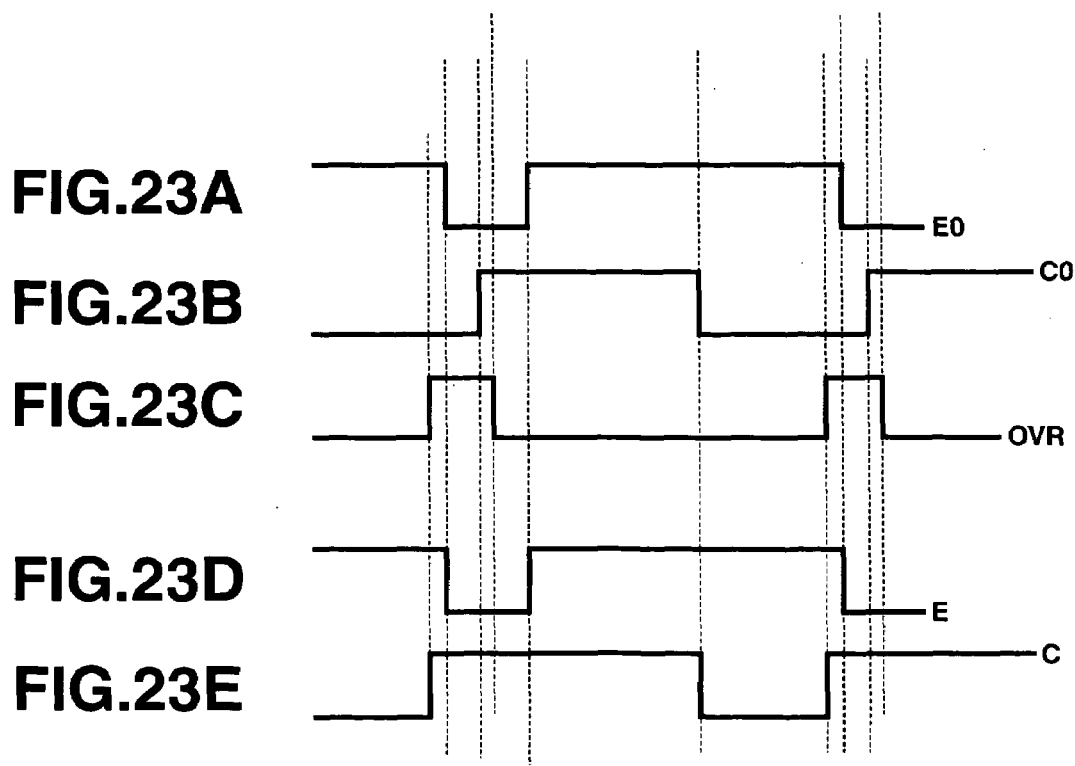

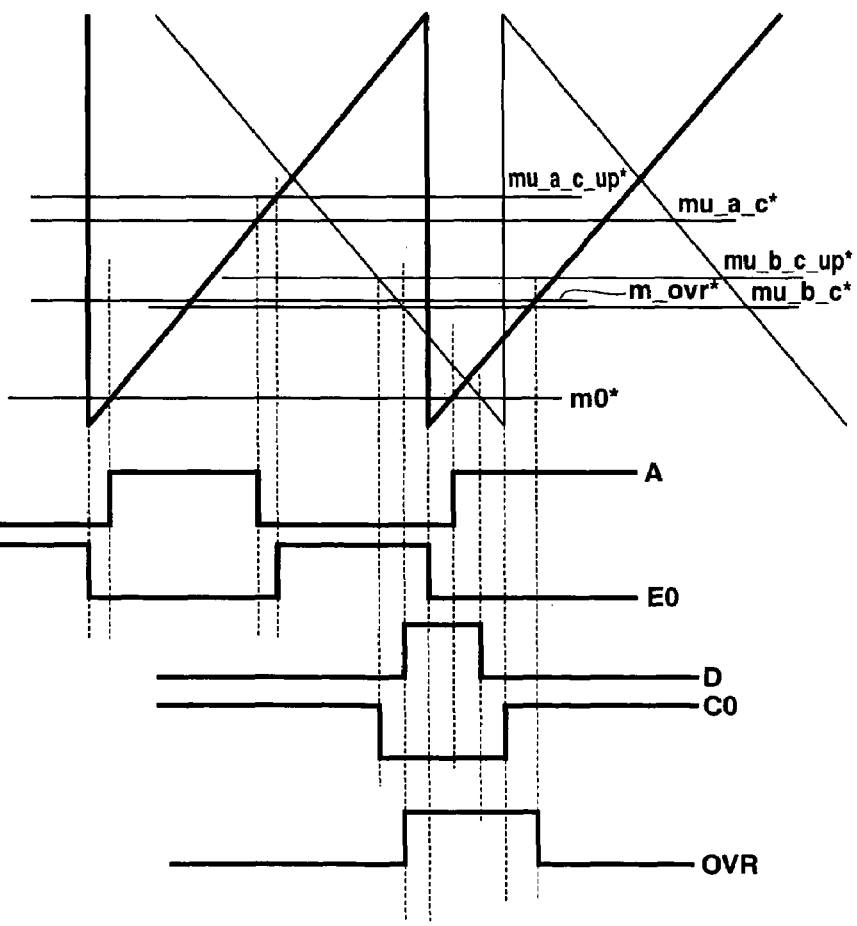

FIG.26

TABLE 1

|  |  | CORRECTION FOR POWER SUPPLY a vx_a_dt | CORRECTION FOR POWER SUPPLY b vx_b_dt |
|---|---|---|---|
| SIGN OF CURRENT VALUE + |  | Td·Vdc_a/Tc | Td·Vdc_b/Tc |
| SIGN OF CURRENT VALUE − | Vdc_b>Vdc_a | Td·Vdc_a/Tc | −Td·Vdc_b/Tc |
|  | Vdc_b<Vdc_a | −Td·Vdc_a/Tc | Td·Vdc_b/Tc |

TABLE 2

|  |  | CORRECTION FOR POWER SUPPLY a vx_a_dt | CORRECTION FOR POWER SUPPLY b vx_b_dt |
|---|---|---|---|
| SIGN OF CURRENT VALUE + |  | Ka·Vdc_a | Kd·Vdc_b |
| SIGN OF CURRENT VALUE − | Vdc_b>Vdc_a | Ka·Vdc_a | −Kd·Vdc_b |
|  | Vdc_b<Vdc_a | −Ka·Vdc_a | Kd·Vdc_b |

TABLE 3

|  |  | CORRECTION FOR POWER SUPPLY a mx_a_dt | CORRECTION FOR POWER SUPPLY b mx_b_dt |
|---|---|---|---|
| SIGN OF CURRENT VALUE + |  | 2Td/Tc | 2Td/Tc |
| SIGN OF CURRENT VALUE - | R_SW=ON (1) Vdc_b>Vdc_a | 2Td/Tc | -2Td/Tc |
|  | R_SW=OFF (0) Vdc_b<Vdc_a | -2Td/Tc | 2Td/Tc |

TABLE 4

|  |  | CORRECTION FOR POWER SUPPLY a mx_a_dt | CORRECTION FOR POWER SUPPLY b mx_b_dt |
|---|---|---|---|
| SIGN OF CURRENT VALUE + |  | Ka' | Kb' |
| SIGN OF CURRENT VALUE - | R_SW=ON (1) Vdc_b>Vdc_a | Ka' | -Kb' |
|  | R_SW=OFF (0) Vdc_b<Vdc_a | -Ka' | Kb' |

(x=u, v, w)

ELECTRIC POWER CONVERSION APPARATUS FOR PLURAL DC VOLTAGE SOURCES AND AN AC ELECTRICAL LOAD

BACKGROUND OF THE INVENTION

The present invention relates generally to electric power conversion apparatuses and methods, and more particularly to electric power conversion apparatuses and methods adapted to be electrically connected to a plurality of power supplies.

Japanese Patent Application Publication No. 2002-118981 (JP2002-118981) shows an electric power conversion system which employs a fuel cell as a main power supply and a battery as a sub power supply to drive an electric motor. While the fuel cell is connected electrically and directly to the motor, the battery is electrically connected to the motor via a DCDC (Direct Current to Direct Current) converter. The output voltage of the DCDC converter is controlled in order to improve the output efficiency of the power supplies.

SUMMARY OF THE INVENTION

In the electric power conversion system of JP2002-118981, the provision of the DCDC converter causes an increase in the size of the whole system including the power supplies, the electric power conversion system and the motor, and causes a power loss due to the DCDC converter in charging and discharging the battery.

Accordingly, it is an object of the present invention to provide an electric power conversion apparatus and method which employs a plurality of power supplies (not limited to the combination of fuel cell and battery) in no need of a separate DCDC converter, and accordingly which is constructed compact and operates with a minimum power loss.

According to one aspect of the present invention, an electric power conversion apparatus comprises: a power converter adapted to be electrically connected to at least a first DC voltage source, a second DC voltage source and a load including an AC electric motor, and configured to generate an individual output voltage pulse train from an output voltage of each of the DC voltage sources in accordance with a switch drive signal set, to synthesize a final output voltage from the individual output voltage pulse trains, and to drive the AC electric motor with the final output voltage; and a power-converter control unit configured to control the switch drive signal set, the power-converter control unit including a PWM pulse generation section configured to perform the following: comparing a voltage command value with a PWM carrier for each of the DC voltage sources; and generating based on the comparison a first PWM pulse train for supplying a first output voltage pulse train from the first DC voltage source to the load and a second PWM pulse train for supplying a second output voltage pulse train from the second DC voltage source to the load in such a manner to form a pulse continuous in time in the final output voltage at least from each pulse of the first output voltage pulse train and a subsequent pulse of the second output voltage pulse train. The PWM pulse generation section may be configured to provide constantly a current path from the load to at least one of the DC voltage sources.

According to another aspect of the invention, an electric power conversion apparatus comprises: power conversion means for generating an individual output voltage pulse train from an output voltage of each of first and second DC voltage sources in accordance with a switch drive signal set, to synthesize a final output voltage from the individual output voltage pulse trains, and to drive an AC electric motor included in a load with the final output voltage; and control means for controlling the switch drive signal set, the control means including PWM pulse generation means for performing the following: comparing a voltage command value with a PWM carrier for each of the DC voltage sources; and generating based on the comparison a first PWM pulse train for supplying a first output voltage pulse train from the first DC voltage source to the load and a second PWM pulse train for supplying a second output voltage pulse train from the second DC voltage source to the load in such a manner to form a pulse continuous in time in the final output voltage at least from each pulse of the first output voltage pulse train and a subsequent pulse of the second output voltage pulse train.

According to a further aspect of the invention, a method for controlling an electric power conversion apparatus comprising a power converter adapted to be electrically connected to at least a first DC voltage source, a second DC voltage source and a load including an AC electric motor, and configured to generate an individual output voltage pulse train from an output voltage of each of the DC voltage sources in accordance with a switch drive signal set, to synthesize a final output voltage from the individual output voltage pulse trains, and to drive the AC electric motor with the final output voltage, and a power-converter control unit configured to control the switch drive signal set, comprises: comparing a voltage command value with a PWM carrier for each of the DC voltage sources; and generating based on the comparison a first PWM pulse train for supplying a first output voltage pulse train from the first DC voltage source to the load and a second PWM pulse train for supplying a second output voltage pulse train from the second DC voltage source to the load in such a manner to form a pulse continuous in time in the final output voltage at least from each pulse of the first output voltage pulse train and a subsequent pulse of the second output voltage pulse train.

BRIEF DESCRIPTION OF THE DRAWINGS

FIGS. 8A to 8F are diagrams showing an example of switch drive signals generated based on comparison between a U-phase instantaneous modulation factor command value and the sawtooth PWM carriers of FIG. 6.

FIG. 9 is a logic circuit diagram showing a process for the switch drive signals of FIGS. 8A to 8F.

FIGS. 10A to 10G are diagrams showing an example of a process of generating a signal OVR with respect to the other switch drive signals in the first embodiment.

FIGS. 11A to 11G are diagrams showing an example of a process of generating switch drive signals E and C based on comparison in magnitude between the output voltages of DC voltage sources.

FIGS. 12A to 12G are diagrams showing another example of the process of generating switch drive signals E and C based on comparison in magnitude between the output voltages of the DC voltage sources.

FIG. 18 is a diagram showing the waveform of PWM carriers employed in the PWM pulse generation section of an electric power conversion apparatus in accordance with a third embodiment of the present invention, where the PWM carriers have triangular waveforms with a phase shift.

FIGS. 19A to 19C are diagrams showing an example of a process of generating switch drive signals A and E0 based on comparison between a U-phase instantaneous modulation factor command value and the triangular PWM carriers of FIG. 18.

FIGS. 20A to 20C are diagrams showing an example of a process of generating switch drive signals D and C0 based on comparison between the U-phase instantaneous modulation factor command value and the triangular PWM carriers of FIG. 18.

FIG. 21 is a diagram showing how to set the phase shift between the triangular PWM carriers of FIG. 18.

FIGS. 22A to 22E are diagrams showing an example of a process of generating switch drive signals E and C based on comparison in magnitude between the output voltages of the DC voltage sources.

FIGS. 23A to 23E are diagrams showing another example of the process of generating switch drive signals E and C based on comparison in magnitude between the output voltages of the DC voltage sources.

FIGS. 24A to 24F are diagrams showing an example of switch drive signals generated based on comparison between the U-phase instantaneous modulation factor command value and the sawtooth PWM carriers.

FIG. 26 is a diagram showing a table employed by a voltage correction computation section of the power-control/modulation-factor-computation section of FIG. 25.

FIG. 29 is a diagram showing a table employed by a voltage correction computation section of a power-control/modulation-factor-computation section of an electric power conversion apparatus in accordance with a fifth embodiment of the present invention.

FIG. 31 is a diagram showing a table employed by a voltage correction computation section of the power-control/modulation-factor-computation section of FIG. 30.

FIG. 32 is a diagram showing a table employed by a voltage correction computation section of a power-control/modulation-factor-computation section of an electric power conversion apparatus in accordance with an eighth embodiment of the present invention.

DETAILED DESCRIPTION OF THE INVENTION

Figure 1:
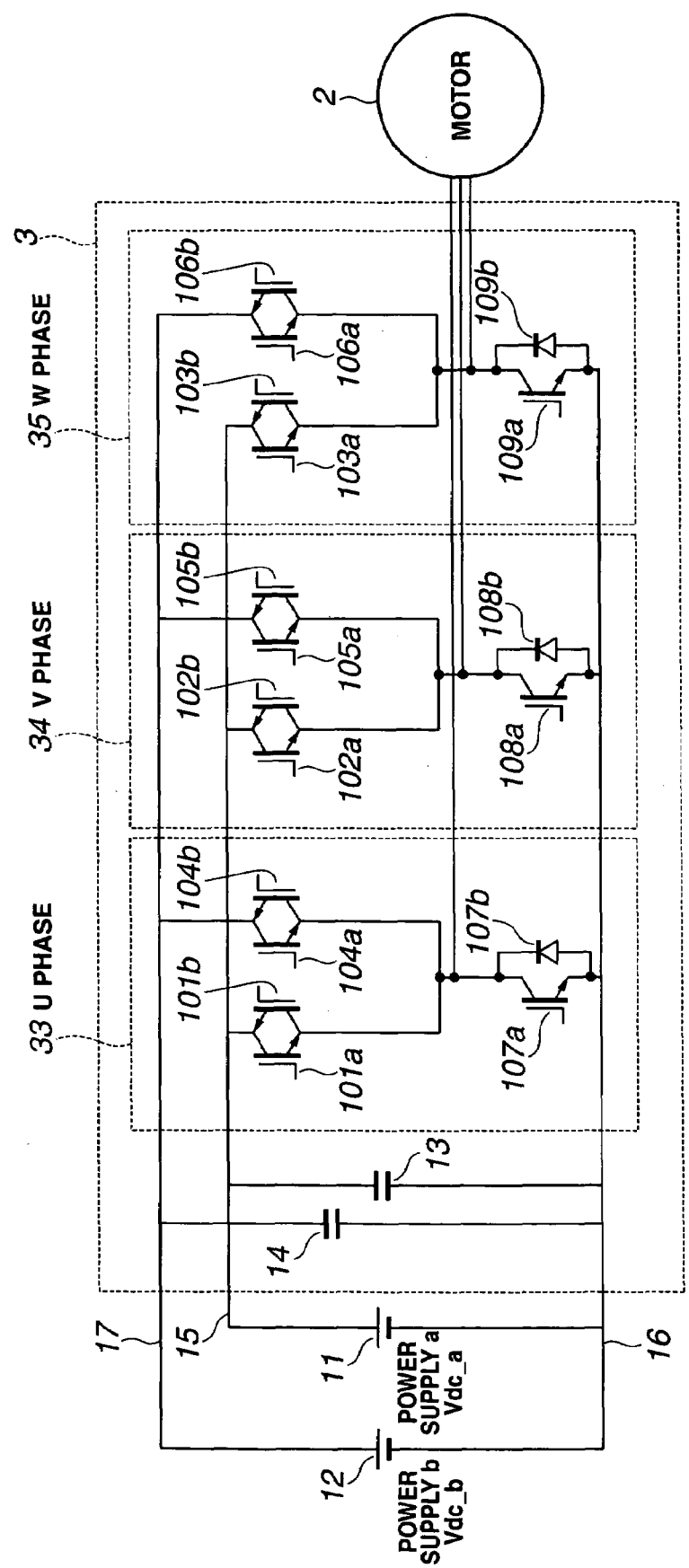
FIG. 1 is a schematic circuit diagram showing a power converter of an electric power conversion apparatus in accordance with a first embodiment of the present invention.

FIG. 1 shows a schematic circuit diagram of a power converter of an electric power conversion apparatus in accordance with a first embodiment of the present invention. The power converter is adapted to be electrically connected to a plurality of voltage sources and to a three-phase synchronous electric motor. In the circuit diagram of FIG. 1, the negative pole of a DC voltage source a 11 and the negative pole of a DC voltage source b 12 are both electrically connected to a common negative bus 16. A power converter 3 includes a U-phase section 33, a V-phase section 34 and a W-phase section 35, each of which includes a contact adapted to be electrically connected to a respective one of the contacts of a three-phase synchronous electric motor 2. Between common negative bus 16 and the contact of U-phase section 33, V-phase section 34 and W-phase section 35 are disposed a combination of a semiconductor switch 107a and a diode 107b, a combination of a semiconductor switch 108a and a diode 108b, and a combination of a semiconductor switch 109a and a diode 109b, respectively, as in the lower arm of a conventional inverter. The positive pole of DC voltage source a 11 is electrically connected to a positive bus 15. Between positive bus 15 and the contact of U-phase section 33, V-phase section 34 and W-phase section 35 are disposed a combination of semiconductor switches 101a and 101b, a combination of semiconductor switches 102a and 102b, and a combination of semiconductor switches 103a and 103b, respectively, each of which is adapted to be controlled to regulate a state of conductivity in each direction. The positive pole of DC voltage source b 12 is electrically connected to a positive bus 17. Between positive bus 17 and the contact of U-phase section 33, V-phase section 34 and W-phase section 35 are disposed a combination of semiconductor switches 104a and 104b, a combination of semiconductor switches 105a and 105b, and a combination of semiconductor switches 106a and 106b, respectively, each of which is adapted to be controlled to regulate a state of conductivity in each direction. A smoothing capacitor 13 is electrically connected between positive bus 15 and common negative bus 16, whereas a smoothing capacitor 14 is electrically connected between positive bus 17 and common negative bus 16. Thus, power converter 3 operates as a DCAC (Direct Current to Alternating Current) power converter, generating three-phase voltages applied to motor 2 based on the three electric potentials, i.e. common negative bus 16, positive bus 15 for DC voltage source a 11, and positive bus 17 for DC voltage source b 12. The semiconductor switches are controlled to generate a voltage outputted to each phase of motor 2. Specifically, the semiconductor switches are controlled connect one of the plurality of electric potentials to each contact of motor 2. The proportion of the period of connection of each semiconductor switch is controlled to supply a necessary set of voltages to motor 2.

Figure 2:
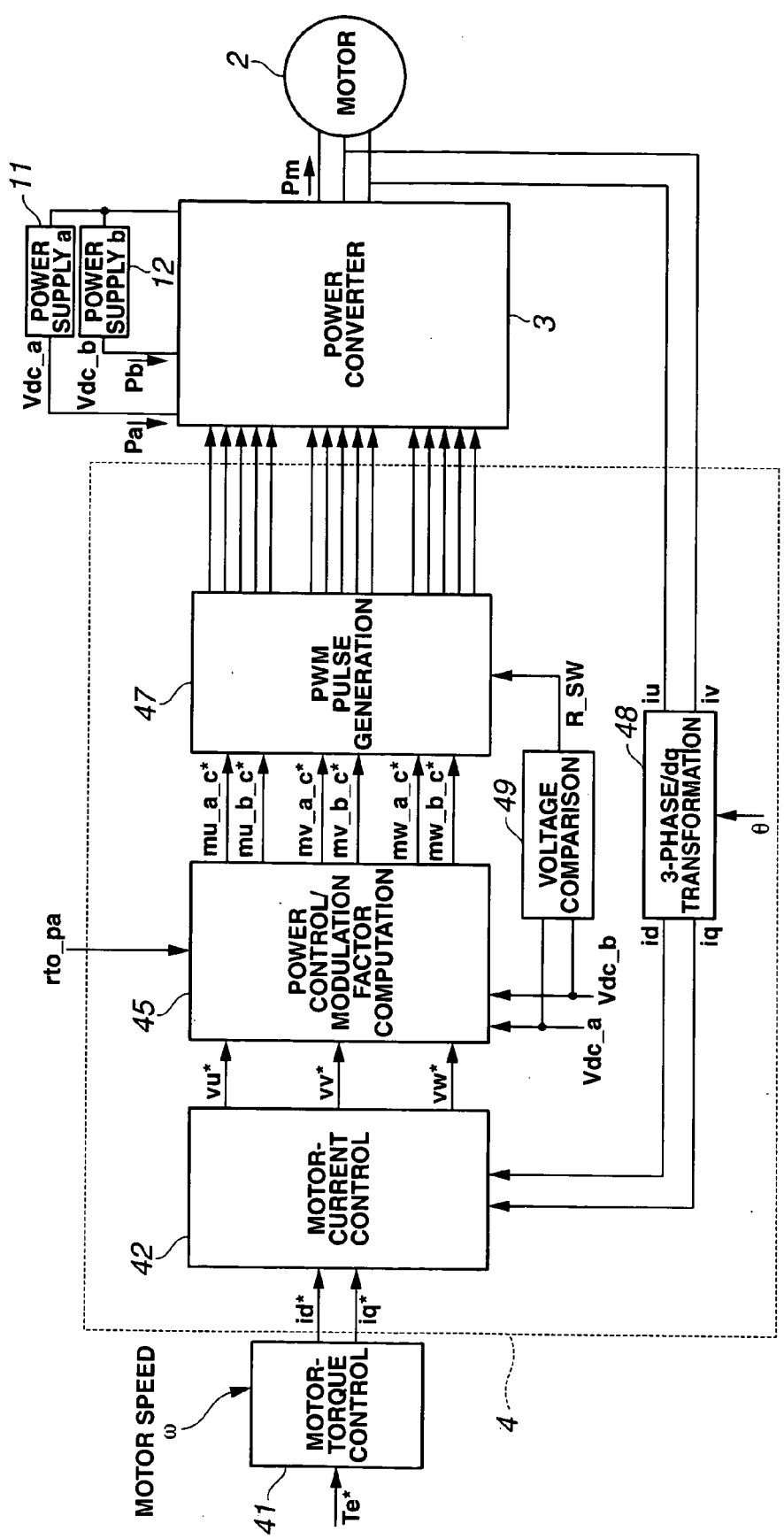
FIG. 2 is a schematic block diagram showing the electric power conversion apparatus of the first embodiment.

FIG. 2 shows the system configuration of a power-converter control unit 4 of the electric power conversion apparatus. A motor-torque control section 41 is configured to compute a command value id* of the d-axis current of motor 2 and a command value iq* of the q-axis of motor 2 based on a motor-torque command value Te* and a motor speed value ω which are given from outside. Specifically, motor-torque control section 41 refers to stored information concerning a prepared map having an axis of Te* and an axis of ω and outputs id* and iq* in accordance with given Te* and ω. A motor-current control section 42 is configured to control the motor current based on d-axis current command value id* and q-axis current command value iq*, and based on a d-axis current measured value id and a q-axis current measured value iq outputted from a three-phase/dq transformation section 48, in order that id and iq follow id* and iq*, respectively. Motor-torque control section 41 finally outputs a U-phase voltage command value vu*, a V-phase voltage command value vv*, and a W-phase voltage command value vw*.

Figure 3:
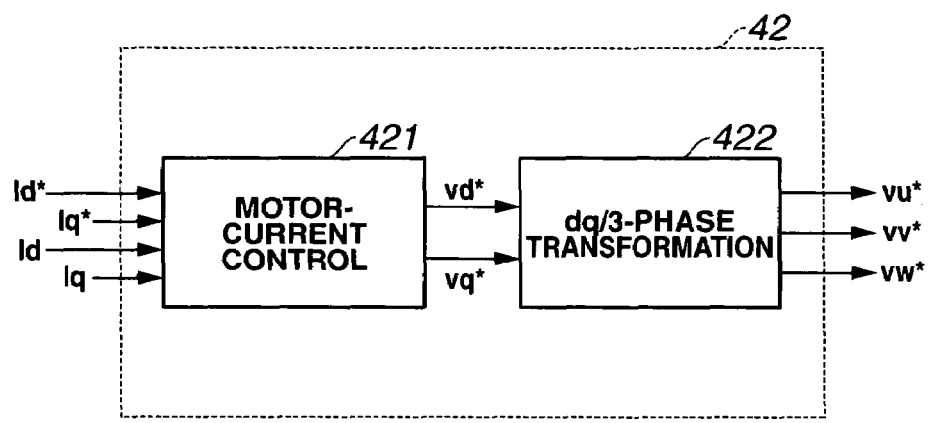
FIG. 3 is a schematic block diagram showing a motor-current control section of the electric power conversion apparatus of FIG. 2.

FIG. 3 shows the detailed system configuration of motor-current control section 42. A motor-current controller 421 is configured to receive id* and iq* from motor-torque control section 41 and id and iq from three-phase/dq transformation section 48, and to output a d-axis voltage command value vd* and a q-axis voltage command value vq* by a feedback control process based on the PI control method, in order that id and iq follow id* and iq*, respectively. Three-phase/dq transformation section 48 computes a W-phase current measured value iw based on a U-phase current measured value iu and V-phase current measured value iv which are measured by current sensors, and converts iu, iv and iw into id and iq. A dq/three-phase transformation section 422 is configured to receive the d-axis voltage command value vd* and q-axis voltage command value vq*, and to transform them into U-phase voltage command value vu*, V-phase voltage command value vv*, and W-phase voltage command value vw*.

Referring back to FIG. 2, a power-control/modulation-factor-computation section 45 is configured to receive an allocated power proportion target value rto_pa and an allocated power proportion target value rto_pb which are each a target value of an allocated power proportion of an associated one of DC voltage source a 11 and DC voltage source b 12, and to perform a power control process. The allocated power proportion target values are determined and given by an outside controller in such a manner to optimize the power proportions and to improve the total output efficiency of the DC voltage sources. Allocated power proportion target value rto_pa and allocated power proportion target value rto_pb are defined to have the following relationship.

$$rto\_pa + rto\_pb = 1$$

Accordingly, when one of the allocated power proportion target values are given, it is possible to determine the other using the above relationship. In this example of FIG. 2, power-control/modulation-factor-computation section 45 receives only the allocated power proportion target value rto_pa and computes the allocated power proportion target value rto_pb.

Figure 4:
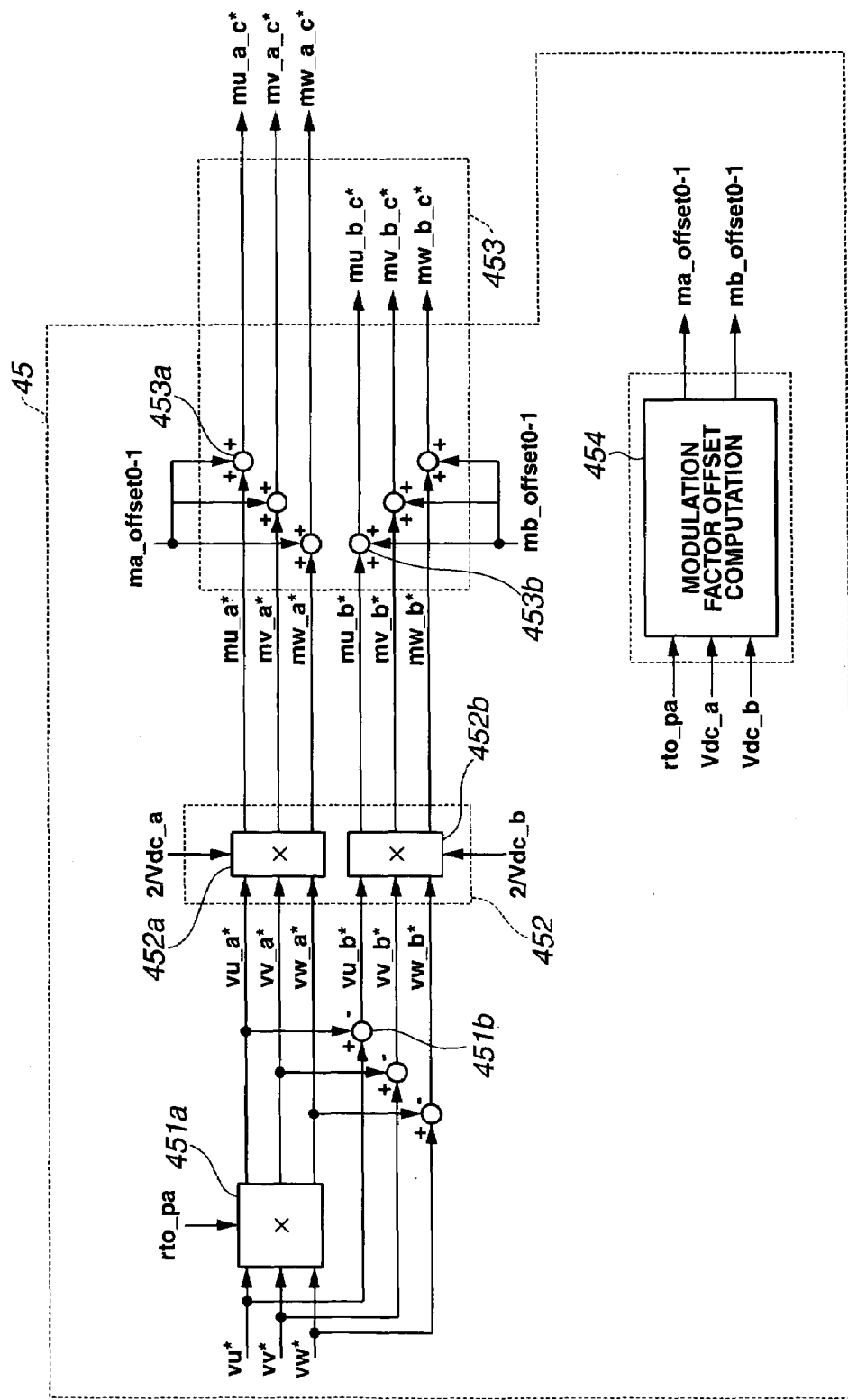
FIG. 4 is a schematic block diagram showing a power-control/modulation-factor-computation section of the electric power conversion apparatus of FIG. 2.

FIG. 4 shows the detailed system configuration of power-control/modulation-factor-computation section 45. A multiplier 451a is configured to multiply vu*, vv* and vw* with rto_pa to produce a U-phase voltage command value vu_a*, a V-phase voltage command value vv_a*, and a W-phase voltage command value vw_a* for DC voltage source a 11 as follows.

$$vu\_a^* = vu^* \cdot rto\_pa$$

$$vv\_a^* = vv^* \cdot rto\_pa$$

$$vw\_a^* = vw^* \cdot rto\_pa$$

On the other hand, a subtracter 451b is configured to subtract vu_a*, vv_a* or vw_a* from vu*, vv* and vw*, respectively, to produce a U-phase voltage command value vu_b*, a V-phase voltage command value vv_b*, and a W-phase voltage command value vw_b* for DC voltage source b 12 as follows.

$$vu\_b^* = vu^* - vu\_a^*$$

$$vv\_b^* = vv^* - vv\_a^*$$

$$vw\_b^* = vw^* - vw\_a^*$$

In the following, processes for modulation factor computation and PWM pulse generation are described only with reference to the U phase. However, it is to be noted that similar processes are performed for the V and W phases.

As shown in FIG. 4, a modulation factor computation section 452 is configured to receive a DC voltage source voltage value Vdc_a which is a value of a voltage supplied by DC voltage source a 11 and a DC voltage source voltage value Vdc_b which is a value of a voltage supplied by DC voltage source b 12, and to generate and output instantaneous modulation factor command values mu_a*, mu_b*, mv_a*, mv_b*, mw_a* and mw_b* which are normalized voltage command values. As shown in FIG. 4, modulation factor computation section 452 comprises a multiplier 452a and a multiplier 452b. U-phase voltage command value vu_a* for DC voltage source a 11 and U-phase voltage command value vu_b* for DC voltage source b 12 are normalized by the half value of each DC voltage value to produce a U-phase instantaneous modulation factor command value mu_a* for DC voltage source a 11 and a U-phase instantaneous modulation factor command value mu_b* for DC voltage source b 12 as follows.

$$mu\_a^* = vu\_a^* / (Vdc\_a/2)$$

$$mu\_b^* = vu\_b^* / (Vdc\_b/2)$$

As shown in FIG. 4, a modulation factor command correction section 453 is configured to correct the modulation factor command values based on allocation of the PWM period to obtain final modulation factor command values, in order to achieve actually desired voltage values.

A modulation factor offset computation section 454 is configured to compute modulation factor offset values ma_offset0 and mb_offset0 based on Vdc_a, Vdc_b and rto_pa. rto_pb is calculated by the following equation which is equivalent to the previous equation.

$$rto\_pb = 1 - rto\_pa$$

ma_offset0 and mb_offset0 are calculated by the following equation.

$$ma\_offset0 = \frac{\left|\frac{rto\_pa}{Vdc\_a}\right|}{\left|\frac{rto\_pa}{Vdc\_a}\right| + \left|\frac{rto\_pb}{Vdc\_b}\right|}$$

$$mb\_offset0 = \frac{\left|\frac{rto\_pb}{Vdc\_b}\right|}{\left|\frac{rto\_pa}{Vdc\_a}\right| + \left|\frac{rto\_pb}{Vdc\_b}\right|}$$

Modulation factor offset values ma_offset0 and mb_offset0 as thus computed are added to U-phase instantaneous modulation factor command value mu_a* for DC voltage source a 11 and U-phase instantaneous modulation factor command value mu_b* for DC voltage source b 12 in adders 453a and 453b, respectively. U-phase instantaneous modulation factor final command values mu_a_c* and mu_b_c* are calculated by the following equations.

$$mu\_a\_c^* = mu\_a^* + ma\_offset0 - 1$$

$$mu\_b\_c^* = mu\_b^* + mb\_offset0 - 1$$

Figure 5:
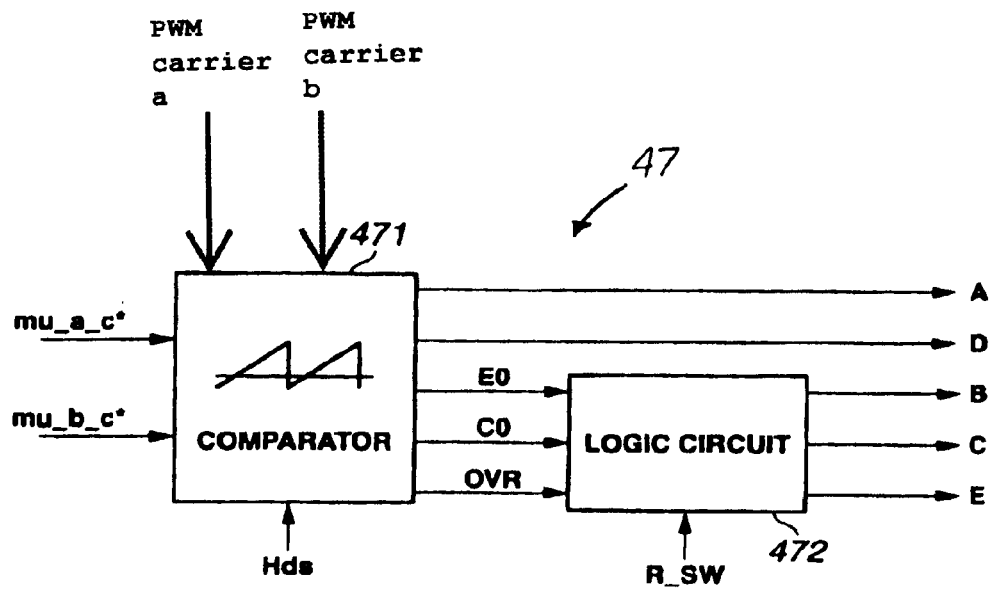
FIG. 5 is a schematic block diagram showing a PWM (Pulse Width Modulation) pulse generation section of the electric power conversion apparatus of FIG. 2.
Figure 6:
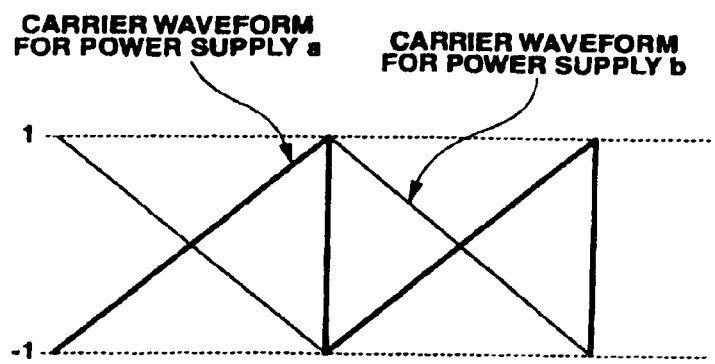
FIG. 6 is a diagram showing the waveform of PWM carriers employed in the PWM pulse generation section of FIG. 5, where the PWM carriers each have a sawtooth waveform.

Referring back to FIG. 2, a PWM pulse generation section 47 is configured to compare the instantaneous modulation factor final command values with PWM carriers, and to control the state of each semiconductor switch based on the comparison by outputting a switch drive signal to each semiconductor switch. FIG. 5 shows the detailed configuration of PWM pulse generation section 47. FIG. 6 shows a PWM carrier waveform for DC voltage source a 11 and a PWM carrier waveform for DC voltage source b 12. The PWM carrier for DC voltage source a 11 has a sawtooth waveform used to generate a PWM pulse train to drive each switch. The PWM carrier for DC voltage source b 12 is similar as for DC voltage source a 11. These PWM carrier waveforms each have an upper limit of +1, a lower limit of -1 and symmetrical shapes with no phase shift with respect to each other.

As shown in FIG. 5, a comparator 471 is configured to receive U-phase instantaneous modulation factor final command values mu_a_c* and mu_b_c* from power-control/modulation-factor-computation section 45, to compare them with the PWM carrier waveforms, to provide a dead time Hds to them, and finally to create the switch drive signals to drive the switches for the U phase.

Figure 7:
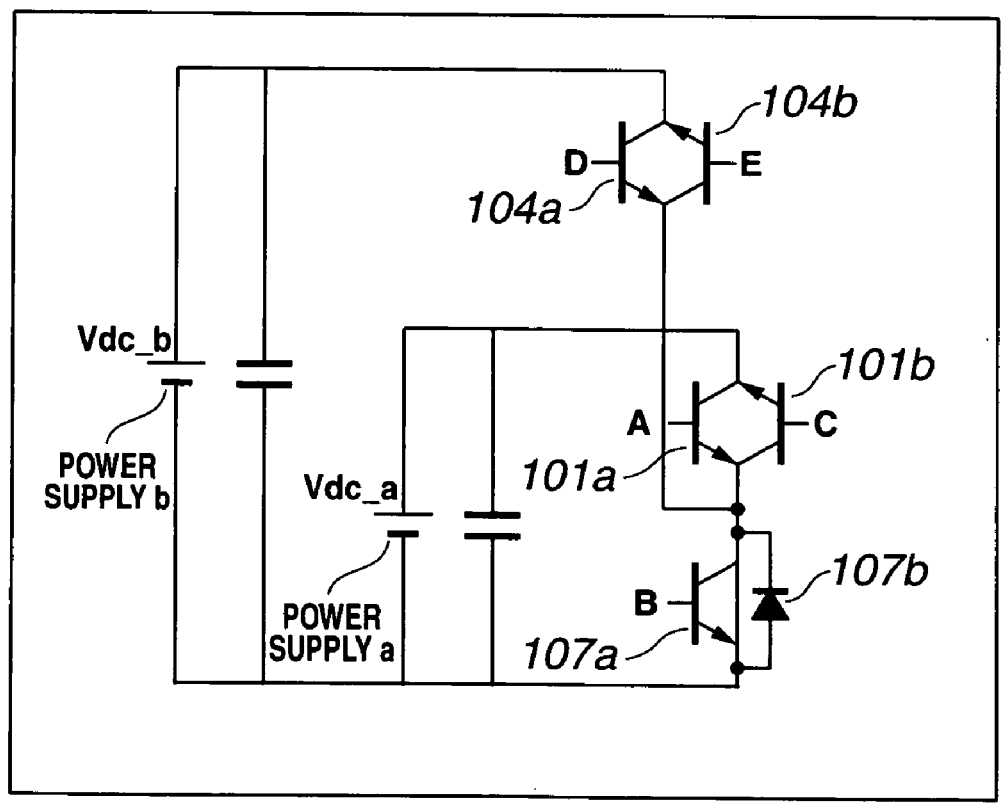
FIG. 7 is a schematic circuit diagram showing a U-phase section of the power converter of FIG. 1.

FIG. 7 shows the U-phase section, in which the switch drive signals for driving the switches for the U phase are identified as follows.

Signal A: outputted to semiconductor switch 101a for selectively providing and preventing conduction from DC voltage source a 11 to the output contact, Signal B: outputted to semiconductor switch 107a for selectively providing and preventing conduction from the output contact to common negative bus 16, Signal C: outputted to semiconductor switch 101b for selectively providing and preventing conduction from the output contact to DC voltage source a 11, Signal D: outputted to semiconductor switch 104a for selectively providing and preventing conduction from DC voltage source b 12 to the output contact, and Signal E: outputted to semiconductor switch 104b for selectively providing and preventing conduction from the output contact to DC voltage source b 12, in which signals A and D are generated by comparator 471 whereas signals B, C and E are generated further through a logic circuit section 472.

FIGS. 8A to 8F show a pulse generation method to define how DC voltage source a 11 outputs a voltage pulse train. It is necessary to hold the switch drive signal A ON in order to output a PWM pulse train from DC voltage source a 11. When the current flows in the electric circuit of FIG. 7, switch drive signal E is conventionally held ON in order to serve as a diode, and to ensure a current path from a load including the motor 2 to the DC voltage sources. When the positive poles have different electric potentials, for example, when Vdc_a is greater than Vdc_b, a state in which switch drive signals A and E are both ON causes a short-circuit current between the positive poles. Therefore, it is necessary to keep the switch drive signal E OFF while switch drive signal A is ON. If switch drive signal A is turned from ON to OFF at the same instant when switch drive signal E is turned from OFF to ON, it actually causes a period in which switch drive signals A and E are both ON, because of a period in which the switch drive signal A is completely turned OFF. As a result, the short-circuit current flows to raise the quantity of heat released from the semiconductor switches disposed in the associated current path. In order to prevent the increase in the released heat, switch drive signal E is turned from OFF to ON after a period in which the switch drive signals A and E are both OFF. Such a short-circuit prevention period (dead time) is provided in the voltage pulse train in such a manner as to prevent the short circuit.

Similarly as the dead time is provided to the combination of switch drive signals A and E, a dead time is provided to the combination of switch drive signals D and C. Further, a dead time is provided to the combination of switch drive signals A and B and to the combination of switch drive signals D and B, in order to prevent a short-circuit current between positive and negative poles. Thus, a short-circuit prevention period is provided for rise or fall of output voltage pulses generated by the switches in such a manner to prevent a short circuit between electric poles having different electric potentials.

With reference to FIGS. 8A to 8F, the following describes how the dead time is provided to the combination of switch drive signals A and E.

Before finally determining and outputting the switch drive signal E, an intermediate switch drive signal E0 is generated based on comparison with the sawtooth PWM carrier.

In order to generate a switch drive signal set with a dead time, a value mu_a_c_down* is determined by adding a downward offset to mu_a_c* corresponding to the dead time as follows.

$$mu\_a\_c\_down^* = mu\_a\_c^* - Hds$$

In order to provide a dead time for rise of each pulse of switch drive signal A, m0* is determined as follows.

$$m0^* = 1 - Hds$$

Switch drive signals A and E0 are determined by comparing mu_a_c*, mu_a_c_down* and m0* with the PWM carrier as follows.

If $mu\_a\_c\_down^* <$ (PWM carrier for DC voltage source a 11), set A=OFF,

If $mu\_a\_c\_down^* \geq$ (PWM carrier for DC voltage source a 11), set A=ON,

If $mu\_a\_c^* \leq$ (PWM carrier for DC voltage source a 11) $\leq m0^*$, set E0=ON, and If $mu\_a\_c^*>$(PWM carrier for DC voltage source $a$ 11), set $E0$=OFF.

As a result of the above method of setting and generating the switch drive signals, a dead time Td is provided between each pulse of switch drive signal A and an associated pulse of switch drive signal E0. When switch drive signal E is set to switch drive signal E0, the short-circuit current between the positive poles are reliably prevented.

The pulse generation method to define how DC voltage source b 12 outputs a voltage pulse train is similar as the above method for DC voltage source a 11. First, a value mu_b_c_down* is determined by adding a downward offset to mu_b_c* corresponding to the dead time as follows.

$mu\_b\_c\_down^* = mu\_b\_c^* - Hds$

Switch drive signals D and C0 are determined by comparing mu_b_c*, mu_b_c_down* and m0* with the PWM carrier as follows.

If $mu\_b\_c\_down^*<$(PWM carrier for DC voltage source $b$ 12), $D$=OFF,

If $mu\_b\_c\_down^*\geq$(PWM carrier for DC voltage source $b$ 12), $D$=ON,

If $mu\_b\_c^*\leq$(PWM carrier for DC voltage source $b$ 12)$\leq m0^*$, $C0$=ON, and If $mu\_b\_c^*>$(PWM carrier for DC voltage source $b$ 12), $C0$=OFF.

Thus, the dead time Td is provided also between each pulse of switch drive signal D and an associated pulse of switch drive signal C0. When switch drive signal C is set to switch drive signal C0, the short-circuit current between the positive poles are reliably prevented.

Switch drive signal B as shown in FIG. 8F is generated by receiving the switch drive signals E0 and C0 from comparator 471 and performing a logical AND of switch drive signals E0 and C0 in logic circuit section 472 shown in FIGS. 5 and 9.

$B = E0 \cdot C0$

As shown in FIGS. 8B and 8D, each pulse of switch drive signal A and an associated pulse of switch drive signal D are continuous in time. Thus, the associated switches are controlled in such a manner that at least one of the switches is in the ON state during switching operation between the DC voltage sources. Accordingly, the voltage pulse outputted from DC voltage source a 11 and the voltage pulse outputted from DC voltage source b 12 form a continuous voltage pulse.

As shown in FIGS. 8C and 8E, there is a period in which the switch drive signals E0 and C0 are both OFF. If switch drive signals E0 and C0 are used as switch drive signals E and C, and if the both switch drive signals are turned OFF when the current is flowing from motor 2 to the DC voltage sources, a voltage is generated at the contact by the inductance of motor 2 and the time differential of the current value. Accordingly, in such a case, it is necessary to set the withstand voltage of each semiconductor switch in consideration of this generated voltage.

In this embodiment, the current path from motor 2 to at least one of the DC voltage sources is constantly provided by controlling the ON/OFF state of each semiconductor switch, in order to minimize the voltage generated at the contact and thereby to reduce the manufacturing cost of the semiconductor switches. As shown in FIGS. 5 and 9, switch drive signals E0 and C0 are corrected in such a manner to prevent the drive signals E and C from being both OFF at a time. Specifically, a signal is OVR for correction and a signal R_SW for comparing in magnitude the output voltages of the DC voltage sources are generated, and logical operations are performed over signals E0, C0, OVR and R_SW to generate switch drive signals E and C.

As shown in FIGS. 10A to 10G, signal OVR is generated by setting a below value m_ovr* and comparing the same with the PWM carriers for DC voltage source a 11 and DC voltage source b 12.

$m\_ovr^* = -1 + 2Hds$

If (PWM carrier for DC voltage source $b$ 12)$\leq m\_ovr^*$ or (PWM carrier for DC voltage source $a$ 11)$\leq m\_ovr^*$, then, set OVR=ON.

Otherwise, set OVR=OFF.

Thus, signal OVR is ON during a period containing a period in which both of switch drive signals E0 and C0 are OFF. Accordingly, the period of the ON state of signal OVR is longer than the period in which both of switch drive signals E0 and C0 are OFF. It is noted that signals OVR and R_SW are expressed to have the ON state and the OFF state for convenience although there is no switches named "OVR" and "R_SW".

Signal R_SW for comparing in magnitude the output voltages of the DC voltage sources is generated by a voltage comparator 49 as shown in FIG. 2. Voltage comparator 49 detects the DC voltage source voltage value Vdc_a and DC voltage source voltage value Vdc_b, compares them, and turns ON signal R_SW when Vdc_b is greater than Vdc_a. This comparing operation is provided with a hysteresis in order to prevent unnecessary frequent switches of signal R_SW due to noise contained in the signals from voltage sensors for detecting Vdc_a and Vdc_b. In order to provide a hysteresis having a width Vhs, signal R_SW is determined as follows.

If $Vdc\_b>Vdc\_a+Vhs$, then turn signal $R\_SW$ from OFF to ON.

If $Vdc\_b<Vdc\_a-Vhs$, then turn signal $R\_SW$ from ON to OFF.

Hysteresis width Vhs is determined based on observation of the magnitude of noise of the voltage signals. If the noise has little effect, signal R_SW may be set without a hysteresis.

Signals OVR and R_SW are thus generated, and inputted into the logic circuit section as shown in FIGS. 5 and 9 in order to generate the switch drive signals E and C. Specifically, switch drive signal E is generated and outputted by performing a logical AND of signals OVR and R_SW, and performing a logical OR of the logical AND signal and switch drive signal E0. On the other hand, switch drive signal C is generated and outputted by performing a logical NOT of signal R_SW, performing a logical AND of the logical NOT signal and signal OVR, and performing a logical OR of the logical AND signal and switch drive signal C0.

FIGS. 11A to 11G show an example of the switch drive signals outputted through the logic circuit section when signal R_SW is ON or when Vdc_b>Vdc_a. In this example, there is no state in which switch drive signals C and E are OFF at a time. Accordingly, it is possible to control the ON/OFF state of the semiconductor switches to ensure the current path from motor 2 to at least one of the DC voltage sources, and thereby to minimize the manufacturing cost of the semiconductor switches. Although there is a state in which the switch drive signals A and E are both ON, the relevant current path is closed by the semiconductor switches to prevent the short-circuit current under condition of Vdc_b>Vdc_a.

On the other hand, FIGS. 12A to 12G show an example of the switch drive signals outputted through the logic circuit section when signal R_SW is OFF or when Vdc_b<Vdc_a. In this example, there is a period in which switch drive signals D and C are both ON at a time. However, the short-circuit current is prevented under condition of Vdc_b<Vdc_a.

Figure 13:
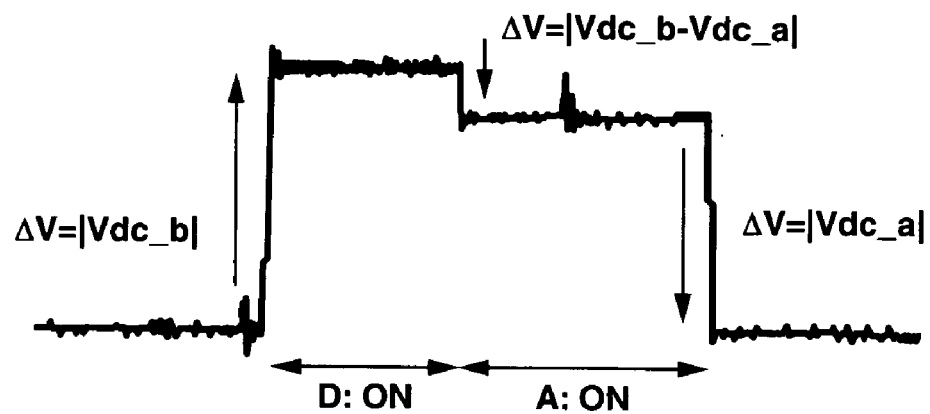
FIG. 13 is a diagram showing an experimental example in which the electric power conversion apparatus outputs an output voltage containing a continuous pulse based on the two DC voltage sources in the first embodiment.

FIG. 13 shows an experimental example in which the electric power conversion apparatus generates an output voltage based on the two symmetrical sawtooth PWM carriers having no phase shift and the computed modulation factor command values. Specifically, FIG. 13 shows the output voltage for the U-phase with respect to common negative bus 16. As shown in FIG. 13, the output voltage pulse consists of a first section based on DC voltage source b 12 and a second section based on DC voltage source a 11.

In this embodiment, the configuration that PWM pulse generation section 47 generates a pattern of the switch drive signals which prevents a short circuit from an electric pole having a higher electric potential to an electric pole having a lower electric potential and allows a short circuit from the electric pole having the lower electric potential to the electric pole having the higher electric potential, is effective for increasing the period in which the current can flow from the load to the DC voltage sources, and thereby for ensuring the current path from the load to the DC voltage sources in each phase of motor 2. The configuration that PWM pulse generation section 47 determines whether it is desired to prevent the short circuit between the same poles or to allow it for each switch, and outputs the switch drive signals based on the determination, is further effective for minimizing damages in the circuit elements due to short-circuit current, and for ensuring the needed current path. The configuration that PWM pulse generation section 47 outputs the switch drive signals based on comparison in magnitude between the output voltages of the DC voltage sources, is further effective for minimizing damages in the circuit elements due to short-circuit current, and for ensuring the needed current path. The configuration that PWM pulse generation section 47 selects and outputs ON signal to one of the switch drive signals based on comparison in magnitude between the output voltages of the DC voltage sources in such a manner to allow only a short-circuit current between the same poles in the direction in which no excessive short-circuit current flows, is further effective for minimizing damages in the circuit elements due to short-circuit current, and for ensuring the needed current path. The configuration that the hysteresis is provided to the comparison in magnitude between the output voltages of the DC voltage sources, is effective for preventing unnecessary frequent switching operations of the signals due to noise contained in the signals from the voltage sensors, and thereby for minimizing a power loss in the switches due to ON/OFF switching operations.

Figure 14:
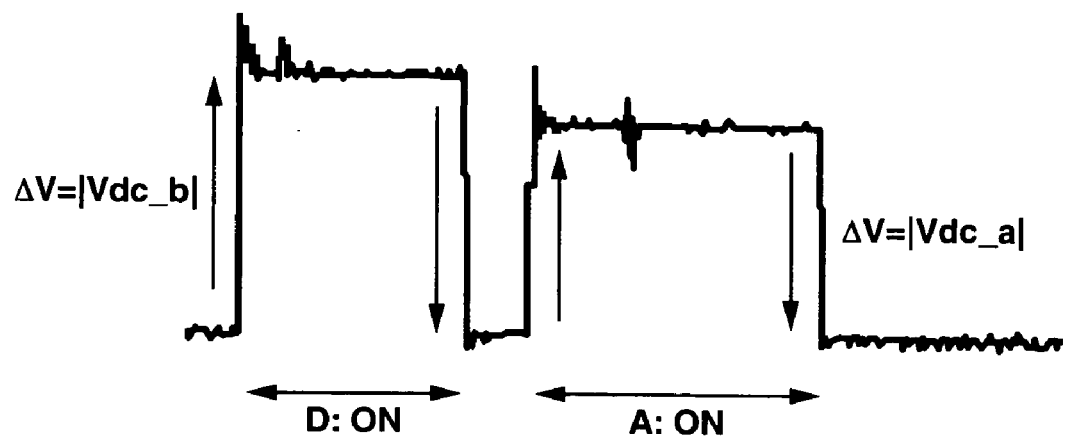
FIG. 14 is a diagram showing an experimental example in which separated pulses are outputted based on the two DC voltage sources in a comparative example.

Theoretically, when employing a pair of symmetrical sawtooth PWM carriers with no phase shift, the operation of turning ON of one switch and the operation of turning OFF of the other switch are performed at a same time. Conventionally, in the electric circuit as shown in FIG. 7, with a dead time provided, a current flows through the diode 107b provided in parallel with switch B after turning OFF the switch D, and then switch A is turned OFF. In this comparative case, the U-phase output voltage changes as shown in FIG. 14, in which the output voltage changes by a gap ΔV (=|Vdc_b|) and by a gap ΔV (=|Vdc_a|) at the time of turning OFF the switch D and at the time of turning ON the switch A, respectively. On the other hand, according to this embodiment, even when employing a pair of symmetrical sawtooth PWM carriers with no phase shift and providing dead times for fall of switch drive signal A and for rise of switch drive signal D, the electric power conversion apparatus prevents a short circuit, outputs a continuous voltage pulse so that the output voltage changes by a small gap ΔV (=|Vdc_b−Vdc_a|) in each voltage pulse as shown in FIG. 13. This is effective for minimizing a switching loss due to voltage changes and passing currents in the circuit elements, and specifically for minimizing a power loss in the semiconductor elements.

Power converter 3, operated as described above, can alter the power proportions of DC voltage source a 11 and DC voltage source b 12 without a DCDC converter for modulating a DC voltage. As a result, the electric power conversion apparatus is constructed compact and of high efficiency.

The following describes an electric power conversion apparatus in accordance with a second embodiment of the present invention, specifically focusing a difference in PWM pulse generation section 47 from that in the first embodiment.

Figure 15:
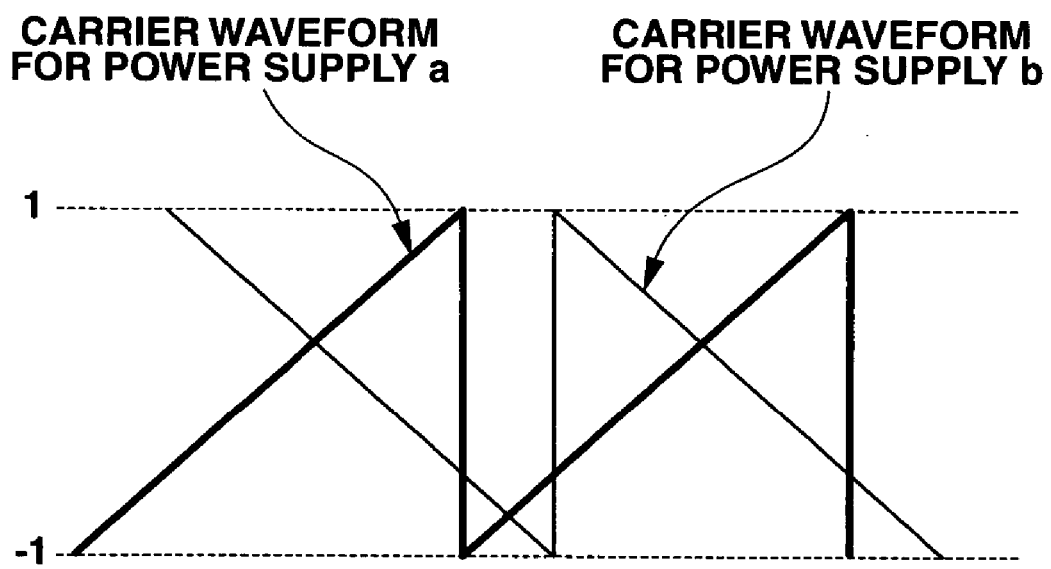
FIG. 15 is a diagram showing the waveform of PWM carriers employed in the PWM pulse generation section of an electric power conversion apparatus in accordance with a second embodiment of the present invention, where the PWM carriers have sawtooth waveforms with a phase shift.

FIG. 15 shows a PWM carrier for DC voltage source a 11 and a PWM carrier for DC voltage source b 12 which are generated in order to generate the PWM pulse trains to drive the switches and then to output the voltage pulse trains from DC voltage source a 11 and DC voltage source b 12, in which each of the PWM carriers for DC voltage source a 11 and DC voltage source b 12 has a sawtooth waveform. The two sawtooth PWM carriers have an upper limit of +1 and a lower limit of −1, and symmetrical waveforms with a phase shift.

With reference to FIGS. 16A to 16F, the following describes how the dead time is provided to the combination of switch drive signals A and E.

Before finally determining and outputting the switch drive signal E, an intermediate switch drive signal E0 is generated based on comparison with the sawtooth PWM carrier.

In order to generate a switch drive signal set with a dead time, a value mu_a_c_up* is determined by adding an upward offset to mu_a_c* corresponding to the dead time as follows.

$$mu\_a\_cup^* = mu\_a\_c^* + Hds$$

Hds is calculated based on the amplitude Hsaw (bottom to top) and the period Tsaw of the sawtooth waveform, and dead time Td as follows.

$$Hds = Td \cdot Hsaw/Tsaw$$

In order to provide a dead time for rise of each pulse of switch drive signal A, m0* is determined as follows.

$$m0^* = -1 + Hds$$

Switch drive signals A and E0 are determined by comparing mu_a_c*, mu_a_c_up* and m0* with the PWM carrier as follows.

If $mu\_a\_c^* \leq$ (PWM carrier for DC voltage source $a$ 11), set $A$=OFF,

If $m0^* \leq$ (PWM carrier for DC voltage source $a$ 11)<$mu\_a\_c^*$, set $A$=ON, If $mu\_a\_c\_up^* \leq$ (PWM carrier for DC voltage source $a$ 11), set $E0$=ON, and If $mu\_a\_c\_up^* >$ (PWM carrier for DC voltage source $a$ 11), set $E0$=OFF.

As a result of the above method of setting and generating the switch drive signals, a dead time Td is provided between each pulse of switch drive signal A and an associated pulse of switch drive signal E0. When switch drive signal E is set to switch drive signal E0, the short-circuit current between the positive poles are reliably prevented.

The pulse generation method to define how DC voltage source b 12 outputs a voltage pulse train in the electric circuit of FIG. 7 is similar as the above method for DC voltage source a 11. First, a value mu_b_c_up* is determined by adding an upward offset to mu_b_c* corresponding to the dead time as follows.

$$mu\_b\_c\_up^* = mu\_b\_c^* + Hds$$

Switch drive signals D and C0 are determined by comparing mu_b_c*, mu_b_c_up* and m0* with the PWM carrier as follows.

If $mu\_b\_c^* \leq$ (PWM carrier for DC voltage source b 12), set D=OFF,

If $m0^* \leq$ (PWM carrier for DC voltage source b 12) $< mu\_b\_c^*$, set D=ON, If $mu\_b\_c\_up^* \leq$ (PWM carrier for DC voltage source b 12), set C0=ON, and If $mu\_b\_c\_up^* >$ (PWM carrier for DC voltage source b 12), set C0=OFF.

Thus, the dead time Td is provided also between each pulse of switch drive signal D and an associated pulse of switch drive signal C0. When switch drive signal C is set to switch drive signal C0, the short-circuit current between the positive poles are reliably prevented.

Figure 16:
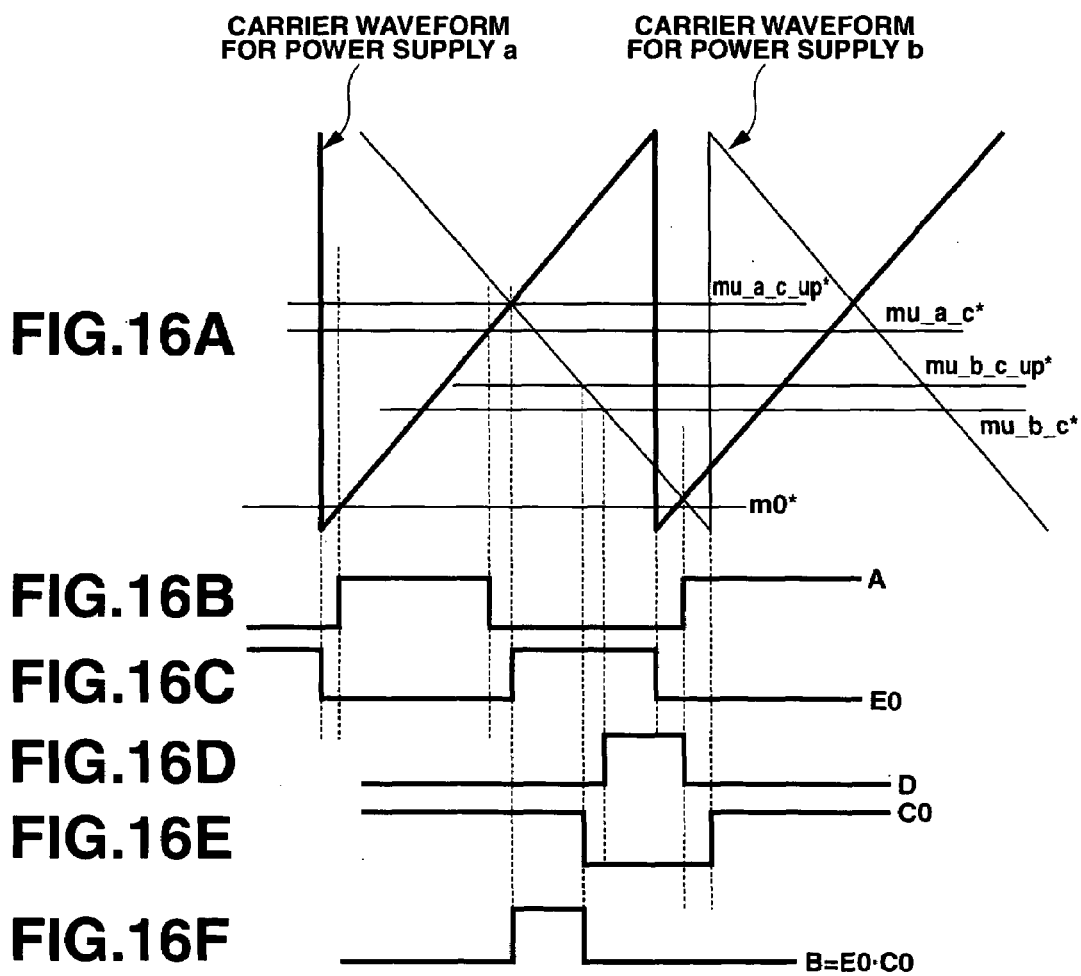
FIGS. 16A to 16F are diagrams showing an example of switch drive signals generated based on comparison between the U-phase instantaneous modulation factor command value and the sawtooth PWM carriers of FIG. 15.
Figure 17:
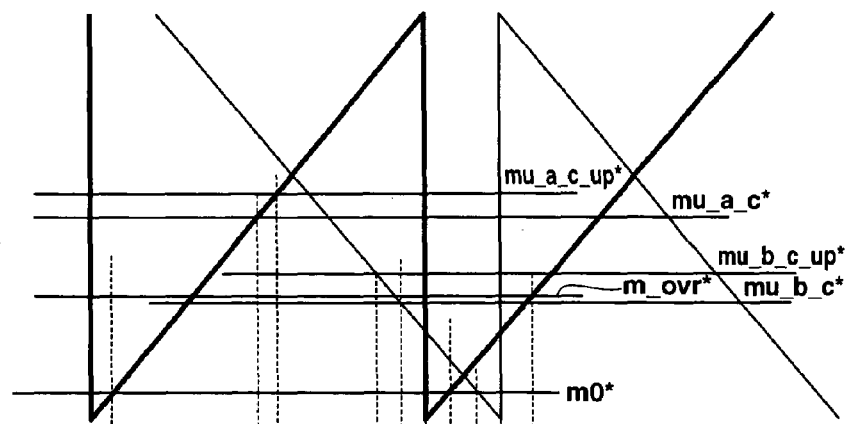
FIGS. 17A to 17F are diagrams showing an example of signal OVR with respect to the other switch drive signals in the second embodiment.

Switch drive signal B as shown in FIG. 16F is generated by receiving the switch drive signals E0 and C0 from comparator 471 and performing a logical AND of switch drive signals E0 and C0 in logic circuit section 472 shown in FIGS. 5 and 9.

$$B = E0 \cdot C0$$

With the above method, the ON pulse of switch drive signal A and the ON pulse of switch drive signal D are separate in general. In the example of FIGS. 15 and 16A to 16F, the phase shift between the PWM carriers is set to a value corresponding to dead time Td×2. The value of the PWM carrier for DC voltage source b 12 becomes a value of 1 a period of 2Td after the time when the value of PWM carrier for DC voltage source a 11 is a value of −1. With the thus determined phase shift, the ON pulse of switch drive signal A and the ON pulse of switch drive signal D are continuous in time as shown in FIGS. 16B and 16D. Accordingly, the voltage pulse outputted from DC voltage source a 11 and the voltage pulse outputted from DC voltage source b 12 form a continuous voltage pulse. On the other hand, in the example of FIGS. 17A to 17F, the phase shift is set in such a manner that the ON pulse of switch drive signal A overlaps in time with the ON pulse of switch drive signal D.

As shown in FIGS. 17A to 17F, signal OVR is generated by setting a below value m_ovr* and comparing the same with the PWM carriers for DC voltage source a 11 and DC voltage source b 12.

$$m\_ovr^* = -1 + 3Hds$$

If (PWM carrier for DC voltage source b 12) $\leq m\_ovr^*$ or (PWM carrier for DC voltage source a 11) $\leq m\_ovr^*$, then, set OVR=ON.

Otherwise, set OVR=OFF.

Subsequently, the voltage pulses are generated to operate the power converter 3 as in the first embodiment.

In this embodiment, the configuration that the output voltage pulses are generated based on comparison between the modulation factor command values and the two symmetrical sawtooth PWM carriers with a phase shift, is effective for continuously outputting the output voltage pulse of DC voltage source a 11 and the output voltage pulse of DC voltage source b 12. Further, the configuration that the phase shift is set to at least double the necessary dead time, is effective for outputting a continuous voltage pulse when a dead time is provided between the rising edge of the ON pulse of switch drive signal A and the falling edge of the ON pulse of switch drive signal D. This minimizes the power loss in the semiconductor elements.

The following describes an electric power conversion apparatus in accordance with a third embodiment of the present invention, specifically focusing a difference in PWM pulse generation section 47 from that in the first embodiment.

FIG. 18 shows a PWM carrier for DC voltage source a 11 and a PWM carrier for DC voltage source b 12 which are generated in order to generate the PWM pulse trains to drive the switches and then to output the voltage pulse trains from DC voltage source a 11 and DC voltage source b 12, in which each of the PWM carriers for DC voltage source a 11 and DC voltage source b 12 has a triangular waveform. The two triangular PWM carriers have an upper limit of +1 and a lower limit of −1, and symmetrical waveforms with a phase shift.

With reference to FIGS. 19A to 19C, the following describes how the dead time is provided to the combination of switch drive signals A and E. Before finally determining and outputting the switch drive signal E, an intermediate switch drive signal E0 is generated based on comparison with the sawtooth PWM carrier.

In order to generate a switch drive signal set with a dead time, a value mu_a_c_up* and a value mu_a_c_down* are determined by adding upward and downward offsets to mu_a_c* corresponding to the dead time as follows.

$$mu\_a\_c\_up^* = mu\_a\_c^* + Hd$$

$$mu\_a\_c\_down^* = mu\_a\_c^* - Hd$$

Hd is calculated based on the amplitude Htr (bottom to top) and the period Ttr of the triangular waveform, and dead time Td as follows.

$$Hd = 2Td \cdot Htr/Ttr$$

Switch drive signals A and E0 are determined by comparing mu_a_c*, mu_a_c_up* and mu_a_c_down* with the PWM carrier as follows.

If $mu\_a\_down^* \geq$ (PWM carrier for DC voltage source a 11), set A=ON,

If $mu\_a\_c^* \leq$ (PWM carrier for DC voltage source a 11), set A=OFF,

If $mu\_a\_c^* \geq$ (PWM carrier for DC voltage source a 11), set E0=OFF, and

If $mu\_a\_c\_up^* \leq$ (PWM carrier for DC voltage source a 11), set E0=ON.

As a result of the above method of setting and generating the switch drive signals, a dead time Td is provided between each pulse of switch drive signal A and an associated pulse of switch drive signal E0. When switch drive signal E is set to switch drive signal E0, the short-circuit current between the positive poles are reliably prevented.

The pulse generation method to define how DC voltage source b 12 outputs a voltage pulse train is similar as the above method for DC voltage source a 11. First, a value mu_b_c_up* and a value mu_b_c_down* are determined by adding upward and downward offsets to mu_b_c* corresponding to the dead time as follows.

$$mu\_b\_c\_up^* = mu\_b\_c^* + Hd$$

$$mu\_b\_c\_down^* = mu\_b\_c^* - Hd$$

Switch drive signals D and C0 are determined by comparing mu_b_c*, mu_b_c_up* and mu_b_c_down* with the PWM carrier as follows.

If $mu\_b\_down^* \geq$ (PWM carrier for DC voltage source b 12), set D=ON,

If $mu\_b\_c^* \leq$ (PWM carrier for DC voltage source b 12), set D=OFF,

If $mu\_b\_c^* \geq$ (PWM carrier for DC voltage source b 12), set C0=OFF, and If $mu\_b\_c\_up^* \leq$ (PWM carrier for DC voltage source b 12), set C0=ON.

Thus, the dead time Td is provided also between each pulse of switch drive signal D and an associated pulse of switch drive signal C0. When switch drive signal C is set to switch drive signal C0, the short-circuit current between the positive poles are reliably prevented.

Switch drive signal B is generated by performing a logical AND of switch drive signals E0 and C0 in logic circuit section 472 as shown in FIGS. 5 and 9.

$$B = E0 \cdot C0$$

As shown in FIG. 21, the phase shift Ttr_s between the triangular PWM carriers is set in such a manner that the bottom point of the PWM carrier for DC voltage source a 11 has the same time point as the point (indicated by a circle in FIG. 21) in which the PWM carrier for DC voltage source b 12 has the same value as mu_b_c_up* in a section in which the value of the PWM carrier for DC voltage source b 12 increases with time.

As shown in FIGS. 22A and 22B, there is a period in which the switch drive signals E0 and C0 are both OFF. Accordingly, as in the first embodiment, switch drive signals E0 and C0 are corrected in such a manner to prevent the drive signals E and C from being both OFF at a time. Specifically, a signal OVR for correction and a signal R_SW for comparing in magnitude the output voltages of the DC voltage sources are generated, and logical operations are performed over signals E0, C0, OVR and R_SW to generate switch drive signals E and C.

As shown in FIG. 22C, signal OVR is generated by setting a below value m_b_c_up2* and comparing the same with the PWM carriers for DC voltage source a 11 and DC voltage source b 12.

$$m\_b\_c\_up2^* = m\_b\_c^* + 2Hd$$

If (PWM carrier for DC voltage source a 11) $\leq m\_a\_c\_up^*$ and (PWM carrier for DC voltage source b 12) $\leq m\_b\_c\_up2^*$, then, set OVR=ON.

Otherwise, set OVR=OFF.

Subsequently, signal R_SW is determined and the final switch drive signals are computed with the logic circuit of FIGS. 5 and 9 as in the first embodiment. FIGS. 22D and 22E show an example of switch drive signals E and C under condition of (Vdc_b>Vdc_a), whereas FIGS. 23D and 23E show an example of switch drive signals E and C under condition of (Vdc_b<Vdc_a).

In this embodiment, the configuration that the modulation factor command values are compared with the two symmetrical triangular PWM carriers having a phase shift, is effective for outputting a continuous voltage pulse when a dead time is provided for each rising edge of the ON pulse of switch drive signal A and the ON pulse of switch drive signal D. This minimizes the power loss in the semiconductor elements.

The following describes an electric power conversion apparatus in accordance with a fourth embodiment of the present invention, specifically focusing a difference in PWM pulse generation section 47 from that in the first embodiment. FIG. 24A shows a set of symmetrical sawtooth PWM carriers used by PWM pulse generation section 47 to generate the output voltage pulses.

The sawtooth PWM carriers of FIG. 24A have a phase shift of a value Tds greater than Td×2. Specifically, in this example, the phase shift is set as Tds=Td×3 as shown in FIG. 24A. Accordingly, the value of the PWM carrier for DC voltage source b 12 becomes a value of 1 the time period Tds after the time when the value of the PWM carrier for DC voltage source a 11 is a value of −1. With this phase shift, the ON pulses of switch drive signals A and D are overlapped in time with each other as shown in FIGS. 24B and 24D, so that the voltage pulse outputted from DC voltage source a 11 and the voltage pulse outputted from DC voltage source b 12 form a continuous voltage pulse.

As shown in FIG. 24F, signal OVR is generated by setting a below value m_ovr* and comparing the same with the PWM carriers for DC voltage source a 11 and DC voltage source b 12.

$$m\_ovr^* = -1 + 4Hds$$

If (PWM carrier for DC voltage source b 12) $\leq m\_ovr^*$ or (PWM carrier for DC voltage source a 11) $\leq m\_ovr^*$, then, set OVR=ON.

Otherwise, set OVR=OFF.

Subsequently, the voltage pulses are generated to operate the power converter 3, as in the first embodiment.

In this embodiment, the configuration that the modulation factor command values are compared with the two symmetrical sawtooth PWM carriers having a phase shift to generate the ON pulse of switch drive signal A and the ON pulse of switch drive signal D which are overlapped in time with each other, is effective for outputting a continuous voltage pulse consisting of the output voltage pulse of DC voltage source a 11 and the output voltage pulse of DC voltage source b 12 even when the ON pulse of switch drive signal A has a delay time with respect to the switch drive signal. Similar advantages are produced by generating the ON pulse of switch drive signal A and the ON pulse of switch drive signal D in such a manner that they overlap in time with each other by at least the dead time. In order to obtain these similar advantages, the first embodiment may be modified at least by providing a phase shift corresponding to the dead time, or the second and third embodiments may be modified at least by providing a further phase shift corresponding to the dead time. This minimizes the power loss in the semiconductor elements.

Figure 25:
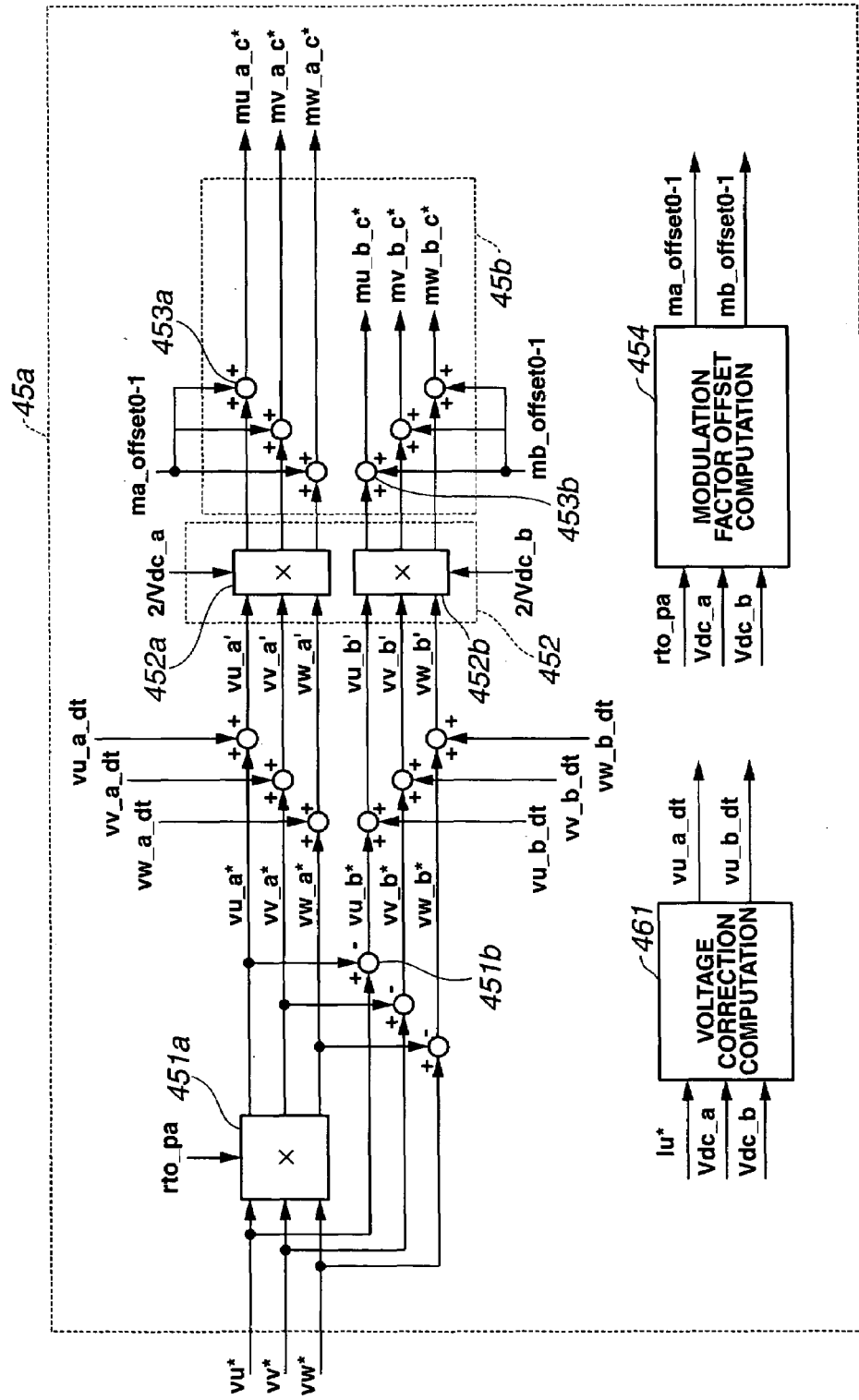
FIG. 25 is a schematic block diagram showing a power-control/modulation-factor-computation section of an electric power conversion apparatus in accordance with a fifth embodiment of the present invention.
Figure 27:
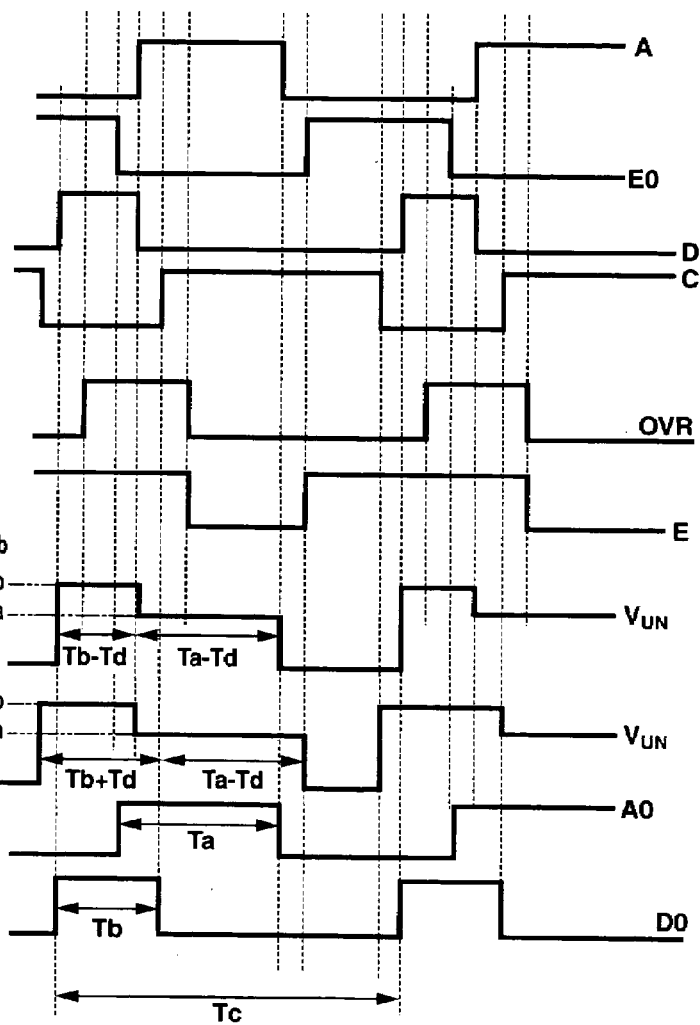
FIGS. 27A to 27J are diagrams showing an example of a U-phase output voltage pulse train with respect to the switch drive signals in the fifth embodiment.
Figure 28:
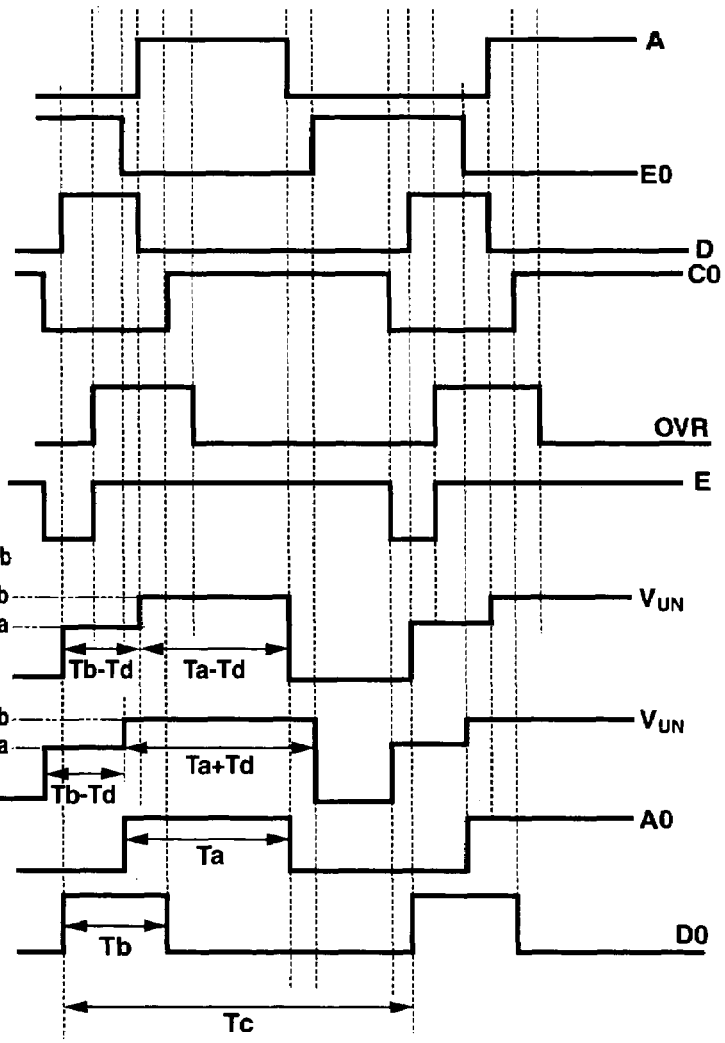
FIGS. 28A to 28J are diagrams showing another example of the U-phase output voltage pulse train in the fifth embodiment.

The following describes an electric power conversion apparatus in accordance with a fifth embodiment of the present invention, which is constructed by replacing the power-control/modulation-factor-computation section 45 of the first, second, third and fourth embodiments as shown in FIG. 4 with a power-control/modulation-factor-computation section 45a as shown in FIG. 25. Power-control/modulation-factor-computation section 45a further includes a voltage correction computation section 461 in addition to the components of power-control/modulation-factor-computation section 45 which are referred to by the same reference signs and whose description is omitted here.

Voltage correction computation section 461 is configured to compute correction values vu_a_dt, vv_a_dt, vw_a_dt, vu_b_dt, vv_b_dt, vw_b_dt, to correct the voltage command values vu_a*, vv_a*, vw_a*, vu_b*, vv_b* and vw_b* by adding (or subtracting) the computed correction values, respectively, and then to determine corrected voltage command values vu_a', vv_a', vw_a', vu_b', vv_b' and vw_b'. Modulation factor computation section 452 computes the instantaneous modulation factor command values mu_a*, mv_a*, mw_a*, mu_b*, mv_b* and mw_b* based on the corrected voltage command values vu_a', vv_a', vw_a', vu_b', vv_b' and vw_b'.

Voltage correction computation section 461 computes the correction values using stored information as shown by Table 1 of FIG. 26. In the following, the formulas of Table 1 are discussed with reference to FIGS. 27A to 27J and 28A to 28J.

FIGS. 27A to 27F or 28A to 28F show the U-phase output voltage pulses generated without the correction of this embodiment, which are identical to those of one of the first, second, third and fourth embodiments. Specifically, FIGS. 27A to 27J show a case of Vdc_b>Vdc_a, showing the switch drive signals for the semiconductor switches for the U phase and a variable $V_{UN}$ which represents a voltage between the U-phase output contact from DC voltage source a 11 or DC voltage source b 12 and common negative bus 16.

During the dead time, the current flow is dependent on the direction of the output current, and the corresponding voltage is outputted. The direction of output from the U-phase output contact of power converter 3 is defined as being positive, as a common definition of the sign of a current value in power converters.

FIGS. 27I and 27J or FIGS. 28I and 28J show switch drive signals referred to as A0 and D0 which represent the switch drive signals A and D without providing the dead time. As shown in FIG. 27G or 28G, when the current value is positive, the voltage pulse outputted from DC voltage source a 11 and the voltage pulse outputted from DC voltage source b 12 are shortened in time by the dead time Td, respectively.

The output voltage commands with respect to common negative bus 16, or vun_a* and vun_b* are each the average of the pulse command during the period of the PWM carrier. Accordingly, vun_a* and vun_b* are expressed by the following equation containing the voltage source voltages Vdc_a and Vdc_b, the periods of the ON pulses Ta and Tb, and the period of the PWM carrier Tc.

$vun\_a^* = Ta \cdot Vdc\_a/Tc$ $vun\_b^* = Tb \cdot Vdc\_b/Tc$

On the other hand, when the dead time is provided and when the current value is positive, the output from DC voltage source a 11 and the output from DC voltage source b 12, or vun_a and vun_b are expressed by the following equations.

$vun\_a = (Ta-Td) \cdot Vdc\_a/Tc$ $vun\_b = (Tb-Td) \cdot Vdc\_b/Tc$

Hence, Δvu_a and Δvu_b, or the errors in the output voltages with respect to the commands, are as follows.

$\Delta vu\_a = vun\_a^* - vun\_a = Td \cdot Vdc\_a/Tc$ $\Delta vu\_b = vun\_b^* - vun\_b = Td \cdot Vdc\_b/Tc$ When the current value is negative, the current flows to the path including the lower voltage source during the period in which switch drive signals C and E are both ON. Under condition of Vdc_b>Vdc_a, the current flows through switch drive signal C so that the output voltage is identical to the voltage Vdc_a for DC voltage source a 11 to which switch drive signal C is connected.

Therefore, the output voltages vun_a and vun_b are as follows.

$vun\_a = (Ta-Td) \cdot Vdc\_a/Tc$ $vun\_b = (Tb+Td) \cdot Vdc\_b/Tc$

Hence, the errors in the output voltages Δvu_a and Δvu_b are as follows.

$\Delta vu\_a = vun\_a^* - vun\_a = Td \cdot Vdc\_a/Tc$ $\Delta vu\_b = vun\_b^* - vun\_b = -Td \cdot Vdc\_b/Tc$ Thus, the dead time and the ON time of signal OVR which is provided in order to ensure the current path, cause the errors in the output voltages with respect to the commands.

Voltage correction computation section 461 selects one of the formulas for calculating the errors based on the sign of the current value and the relationship of the voltage value between the DC voltage sources, and computes the voltage corrections by inputting a predetermined value of the dead time, the frequency of the PWM carrier fc (=1/Tc), and the voltage values of the DC voltage sources. Voltage correction computation section 461 outputs the computed voltage corrections. For example, if Vdc_b>Vdc_a and the U-phase current command value Iu* is negative, the following values vu_a_dt and vu_b_dt are outputted.

$vu\_a\_dt = \Delta vu\_a = Td \cdot Vdc\_a/Tc$ $vu\_b\_dt = \Delta vu\_b = -Td \cdot Vdc\_b/Tc$ With regard to the V and W phases, similar computation is performed.

The sign of the current value is determined based on the current command value for each phase. This current command value is computed performing the transformation from id* and iq* to the three-phase form. Alternatively, the current command value may be determined as a current value measured by a current sensor.

One of the formulas for correction is selected with reference to Table 1 based on the sign of the current value and the relationship in magnitude between the output voltages of the DC voltage sources.

Thus configured and operated, power converter 3 can compensate for the errors in the output voltages so as to regulate the proportions of power of DC voltage source a 11 and DC voltage source b 12 precisely as desired.

The following describes an electric power conversion apparatus in accordance with a sixth embodiment of the present invention, which is constructed based on the fifth embodiment and modified by replacing Table 1 with Table 2 as shown in FIG. 29.

Voltage correction computation section 461 computes the corrections by using the formulas of Table 2. For example, if Vdc_b>Vdc_a and U-phase current command value Iu* is negative, the corrections are calculated as follows.

$$vu\_a\_dt = \Delta vu\_a = Ka \cdot Vdc\_a$$

$$vu\_b\_dt = \Delta vu\_b = -Kb \cdot Vdc\_b$$

where Ka and Kb are gains for computing the voltage correction.

The gains Ka and Kb are predetermined in an experimental manner to minimize the errors.

With voltage correction computation section 461 thus configured and operated, even when delays in the switching operation cause errors in the actual dead time from the set dead time, it is possible to compensate for the errors in the output voltages so as to regulate the proportions of power of DC voltage source a 11 and DC voltage source b 12 precisely as desired.

Figure 30:
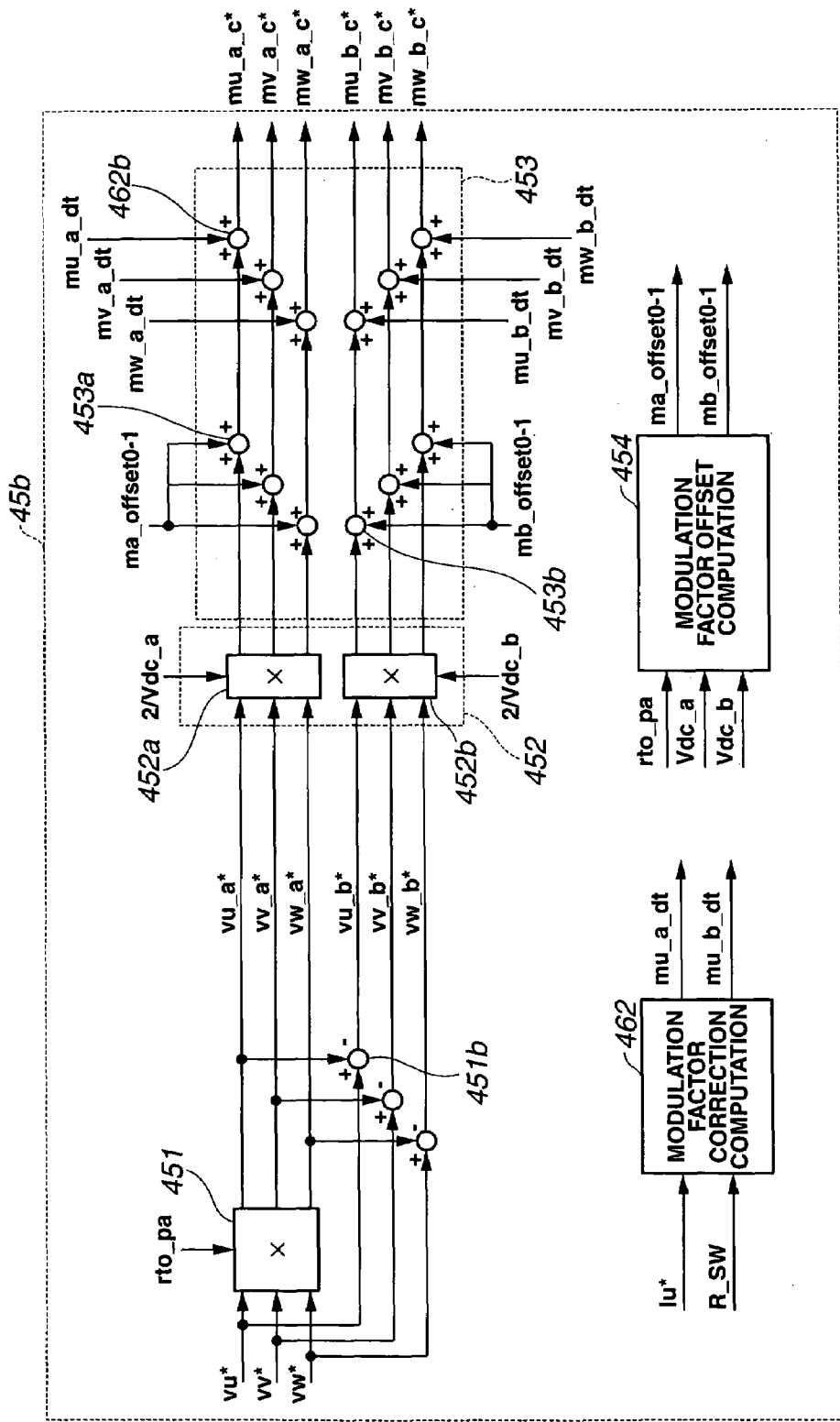
FIG. 30 is a schematic block diagram showing a power-control/modulation-factor-computation section of an electric power conversion apparatus in accordance with a seventh embodiment of the present invention.

The following describes an electric power conversion apparatus in accordance with a seventh embodiment of the present invention, which is constructed by replacing the power-control/modulation-factor-computation section 45 of the first, second, third and fourth embodiments as shown in FIG. 4 with a power-control/modulation-factor-computation section 45b as shown in FIG. 30. Power-control/modulation-factor-computation section 45b further includes a modulation factor correction computation section 462 in addition to the components of power-control/modulation-factor-computation section 45 which are referred to by the same reference signs and whose description is omitted here. Modulation factor correction computation section 462 is configured to compute correction values mu_a_dt, mv_a_dt, mw_a_dt, mu_b_dt, mv_b_dt, mw_b_dt, and to correct the voltage command values mu_a_c*, mv_a_c*, mw_a_c*, mu_b_c*, mv_b_c* and mw_b_c* by adding (or subtracting) the computed correction values, respectively. Specifically, modulation factor correction computation section 462 computes the correction values using stored information as shown by Table 3 of FIG. 31. For example, when signal R_SW is ON, and U-phase current command value Iu* is negative, or when Vdc_b>Vdc_a, and U-phase current command value Iu* is negative, the correction values mu_a_dt and mu_b_dt are calculated as follows.

$$mu\_a\_dt = 2\Delta vu\_a/Vdc\_a = 2Td/Tc$$

$$mu\_b\_dt = 2\Delta vu\_b/Vdc\_b = -2Td/Tc$$

Thus, the corrections for the modulation factors are calculated based on the dead time and the frequency (or period) of the PWM carrier. This calculation is performed in accordance with one of the formulas to Table 3 selected based on the signal R_SW and the sign of the current value.

The computed modulation factor correction values mu_a_dt and mu_b_dt is used to calculate the U-phase instantaneous modulation factor final command values mu_a_c* and mu_b_c* as follows.

$$mu\_a\_c^* = mu\_a^* + ma\_offset0 - 1 + mu\_a\_dt$$

$$mu\_b\_c^* = mu\_b^* + mb\_offset0 - 1 + mu\_b\_dt$$

The above process of computing the modulation factor values with the modulation factor correction values is effective for compensating for the errors in the output voltages so as to regulate the proportions of power of DC voltage source a 11 and DC voltage source b 12 precisely as desired.

The following describes an electric power conversion apparatus in accordance with an eighth embodiment of the present invention, which is constructed based on the seventh embodiment and modified by replacing Table 3 with Table 4 as shown in FIG. 32.

In this embodiment, modulation factor correction computation section 462 performs the computation using the formulas of Table 4. For example, when signal R_SW is ON, and U-phase current command value Iu* is negative, or when Vdc_b>Vdc_a, and U-phase current command value Iu* is negative, the correction values mu_a_dt and mu_b_dt are calculated as follows.

$$mu\_a\_dt = Ka'$$

$$mu\_b\_dt = -Kb'$$

where Ka' and Kb' are values for computing the voltage correction.

The values Ka and Kb are predetermined in an experimental manner to minimize the errors.

With voltage correction computation section 461 thus configured and operated, even when delays in the switching operation cause errors in the actual dead time from the set dead time, it is possible to compensate for the errors in the output voltages so as to regulate the proportions of power of DC voltage source a 11 and DC voltage source b 12 precisely as desired.

Figure 33:
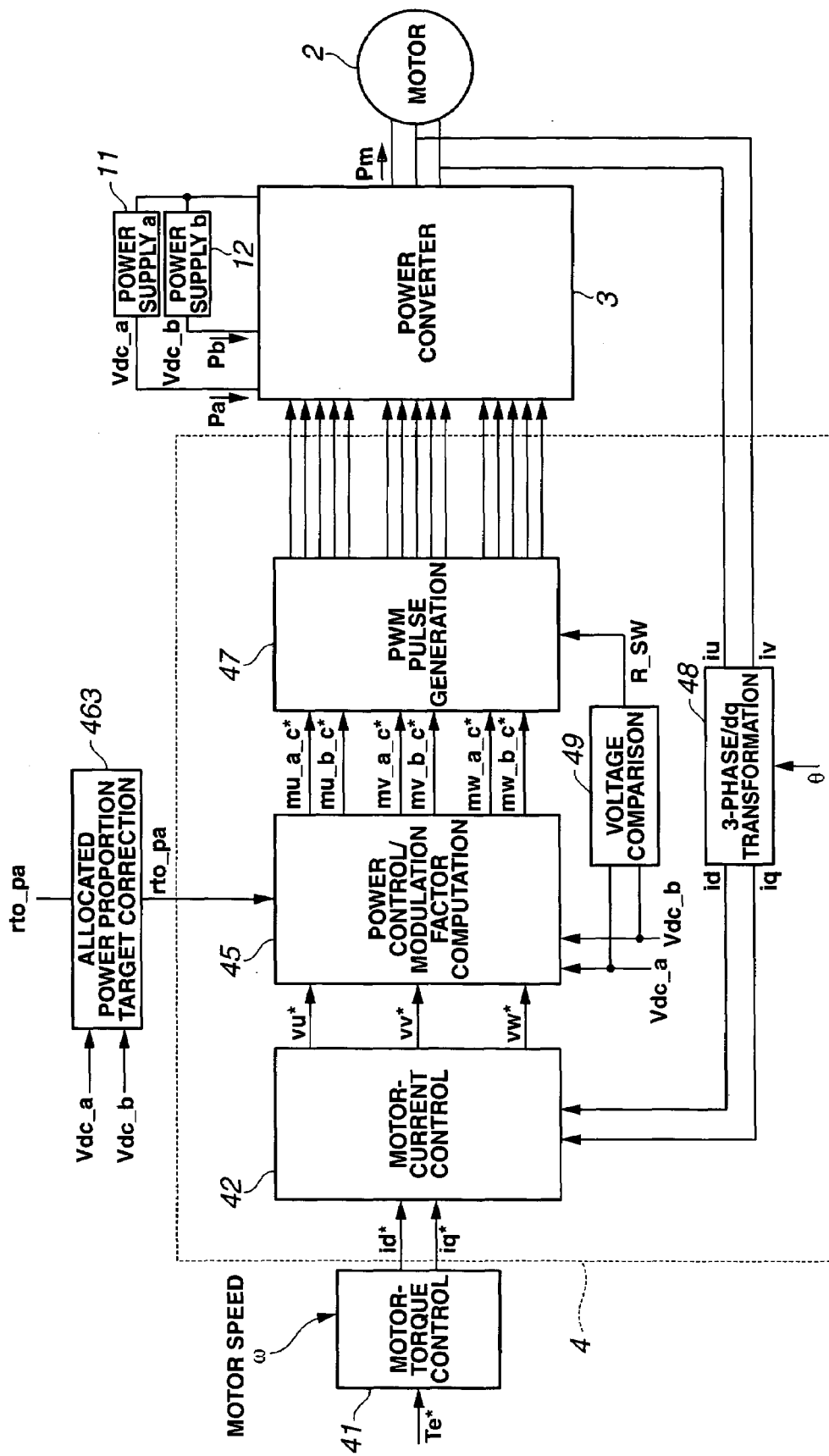
FIG. 33 is a schematic circuit diagram showing a power converter of an electric power conversion apparatus in accordance with a ninth embodiment of the present invention.
Figure 34:
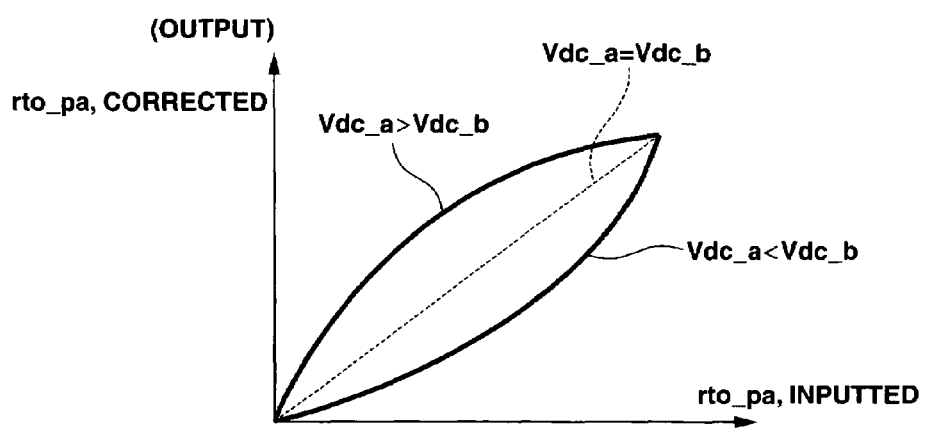
FIG. 34 is a graph showing a process of correction performed by an allocated power proportion target correction section of the electric power conversion apparatus of FIG. 33.

In a ninth embodiment of the present invention, an electric power conversion apparatus is constructed by replacing the system configuration of the first, second, third and fourth embodiments as shown in FIG. 2 with the system configuration as shown in FIG. 33. The electric power conversion apparatus further includes an allocated power proportion target correction section 463 in addition to the components of the basic system which are referred to by the same reference signs and whose description is omitted here. Allocated power proportion target correction section 463 is configured to receive the allocated power proportion target value rto_pa, to correct it, and to output the value rto_pa as corrected. This correction is based on a function as shown in FIG. 34 which defines a relationship between the input value and the corrected value. As shown in FIG. 34, the correction relationship differs in accordance with the relationship in magnitude between the output voltages of the DC voltage sources. This is determined based on experiments on how errors in the output voltages cause errors in the proportions of power.

With the above correction to the allocated power proportion target value, it is possible to compensate for the errors in the output voltages so as to regulate the proportions of power of DC voltage source a 11 and DC voltage source b 12 precisely as desired.

As described above in the present embodiments, the electric power conversion apparatus is constructed to output continuous output voltage pulses. The frequency of the voltage pulse train applied to the AC motor when the power of one of the DC voltage sources is employed is the same as when the power of all of the DC voltage sources is employed. Accordingly, the frequency of audible sounds are constant with respect to change in the proportions of power. This prevents electromagnetic noise annoying operators or drivers from rapidly increasing in response to change in the proportions of power.

This application is based on a prior Japanese Patent Application No. 2005-371990 filed on Dec. 26, 2005. The entire contents of this Japanese Patent Application No. 2005-371990 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric power conversion apparatus comprising:
 a power converter adapted to be electrically connected to at least a first DC voltage source, a second DC voltage source and an AC electrical load, and configured to generate an individual output voltage pulse train from an output voltage of each of the DC voltage sources in accordance with a switch drive signal set, to synthesize a final output voltage from the individual output voltage pulse trains, and to drive the load with the final output voltage; and
 a power-converter control unit configured to control the switch drive signal set, the power-converter control unit including a PWM pulse generation section configured to perform the following:
 comparing a voltage command value with a PWM carrier for each of the DC voltage sources; and
 generating based on the comparison a first PWM pulse train for supplying a first output voltage pulse train from the first DC voltage source to the load and a second PWM pulse train for supplying a second output voltage pulse train from the second DC voltage source to the load in such a manner to form a pulse continuous in time in the final output voltage at least from each pulse of the first output voltage pulse train and a subsequent pulse of the second output voltage pulse train,
 wherein:
 the power converter includes a plurality of phase sections;
 each of the phase sections includes a first switch, a second switch, a third switch, and a contact connected to the load, and connects the DC voltage sources in parallel;
 the second switch is connected between a first pole of the first DC voltage source and the contact;
 the third switch is connected between a first pole of the second DC voltage source and the contact;
 the first switch is connected between the contact and a set of second poles of the DC voltage sources; and
 the power-converter control unit controls the switch drive signal set in such a manner that a first period when the first switch is in an ON state, a second period when the second switch is in an ON state, and a third period when the third switch is in an ON state, are prevented from overlapping with each other, and the second period is continuous with the third period.

2. The electric power conversion apparatus as claimed in claim 1, wherein the PWM pulse generation section is configured to provide a constant current path from the load to at least one of the DC voltage sources.

3. The electric power conversion apparatus as claimed in claim 1, wherein the power converter includes the first switch whose ON state allows a current from the first DC voltage source to the load and the second switch whose ON state allows a current from the second DC voltage source to the load, and wherein the PWM pulse generation section is configured to control the first and second switches in such a manner that at least one of the first and second switches is in the ON state during switching operation between the DC voltage sources.

4. The electric power conversion apparatus as claimed in claim 1, wherein the PWM pulse generation section is configured to perform the following:
 storing information concerning a first PWM carrier used to generate the first PWM pulse train, the first PWM carrier having a sawtooth waveform;
 storing information concerning a second PWM carrier used to generate the second PWM pulse train, the second PWM carrier having a sawtooth waveform which is symmetrical to and identical in phase with the sawtooth waveform of the first PWM carrier; and
 providing a short-circuit prevention period for rise of each pulse of the first output voltage pulse train and for fall of each pulse of the second output voltage pulse train in such a manner to prevent a short circuit between electric poles having different electric potentials.

5. The electric power conversion apparatus as claimed in claim 1, wherein the PWM pulse generation section is configured to perform the following:
 storing information concerning a first PWM carrier used to generate the first PWM pulse train, the first PWM carrier having a sawtooth waveform;
 storing information concerning a second PWM carrier used to generate the second PWM pulse train, the second PWM carrier having a sawtooth waveform symmetrical to the sawtooth waveform of the first PWM carrier; and
 providing a short-circuit prevention period for rise of each pulse of the first output voltage pulse train and for fall of each pulse of the second output voltage pulse train in such a manner to prevent a short circuit between electric poles having different electric potentials, and
 wherein the sawtooth waveform of the second PWM carrier has a phase shift with respect to the sawtooth waveform of the first PWM carrier, the phase shift being set in accordance with the short-circuit prevention period in such a manner that each pulse of the first output voltage pulse train overlaps in time with a subsequent pulse of the second output voltage pulse train.

6. The electric power conversion apparatus as claimed in claim 1, wherein the PWM pulse generation section is configured to perform the following:
 storing information concerning a first PWM carrier used to generate the first PWM pulse train, the first PWM carrier having a sawtooth waveform;
 storing information concerning a second PWM carrier used to generate the second PWM pulse train, the second PWM carrier having a sawtooth waveform symmetrical to the sawtooth waveform of the first PWM carrier; and
 providing a short-circuit prevention period for fall of each pulse of the first output voltage pulse train and for rise of each pulse of the second output voltage pulse train in such a manner to prevent a short circuit between electric poles having different electric potentials, and
 wherein the sawtooth waveform of the second PWM carrier has a phase shift with respect to the sawtooth waveform of the first PWM carrier, the phase shift being set in accordance with the short-circuit prevention period.

7. The electric power conversion apparatus as claimed in claim 6, wherein the phase shift is set by adding a further amount corresponding to the short-circuit prevention period in such a manner that each pulse of the first PWM pulse train overlaps in time with a subsequent pulse of the second PWM pulse train.

8. The electric power conversion apparatus as claimed in claim 1, wherein the PWM pulse generation section is configured to perform the following:
storing information concerning a first PWM carrier used to generate the first PWM pulse train, the first PWM carrier having a triangular waveform;
storing information concerning a second PWM carrier used to generate the second PWM pulse train, the second PWM carrier having a triangular waveform; and
providing a short-circuit prevention period for rise of each pulse of the first output voltage pulse train and
for rise of each pulse of the second output voltage pulse train in such a manner to prevent a short circuit between electric poles having different electric potentials, and
wherein the triangular waveform of the second PWM carrier has a phase shift with respect to the triangular waveform of the first PWM carrier.

9. The electric power conversion apparatus as claimed in claim 8, wherein the phase shift is set by adding a further amount corresponding to the short-circuit prevention period in such a manner that each pulse of the first PWM pulse train overlaps in time with a subsequent pulse of the second PWM pulse train.

10. An electric power conversion apparatus, comprising:
a power converter adapted to be electrically connected to at least a first DC voltage source, a second DC voltage source and an AC electrical load, and configured to generate an individual output voltage pulse train from an output voltage of each of the DC voltage sources in accordance with a switch drive signal set, to synthesize a final output voltage from the individual output voltage pulse trains, and to drive the load with the final output voltage; and
a power-converter control unit configured to control the switch drive signal set, the power-converter control unit including a PWM pulse generation section configured to perform the following:
comparing a voltage command value with a PWM carrier for each of the DC voltage sources; and
generating based on the comparison a first PWM pulse train for supplying a first output voltage pulse train from the first DC voltage source to the load and a second PWM pulse train for supplying a second output voltage pulse train from the second DC voltage source to the load in such a manner to form a pulse continuous in time in the final output voltage at least from each pulse of the first output voltage pulse train and a subsequent pulse of the second output voltage pulse train,
wherein the PWM pulse generation section is configured to perform the following:
comparing in magnitude the output voltages of the DC voltage sources;
providing based on the comparison a short-circuit prevention period in such a manner to prevent a short circuit from an electric pole having a higher electric potential to an electric pole having a lower electric potential; and
allowing based on the comparison a short circuit from an electric pole having a lower electric potential to an electric pole having a higher electric potential in such a manner to provide constantly a current path from the load to at least one of the DC voltage sources.

11. The electric power conversion apparatus as claimed in claim 10, wherein the PWM pulse generation section is configured to provide the short-circuit prevention period in the comparison setting a hysteresis.

12. An electric power conversion apparatus, comprising:
a power converter adapted to be electrically connected to at least a first DC voltage source, a second DC voltage source and a load including an AC electrical load, and configured to generate an individual output voltage pulse train from an output voltage of each of the DC voltage sources in accordance with a switch drive signal set, to synthesize a final output voltage from the individual output voltage pulse trains, and to drive the load with the final output voltage; and
a power-converter control unit configured to control the switch drive signal set, the power-converter control unit including a PWM pulse generation section configured to perform the following:
comparing a voltage command value with a PWM carrier for each of the DC voltage sources; and
generating based on the comparison a first PWM pulse train for supplying a first output voltage pulse train from the first DC voltage source to the load and a second PWM pulse train for supplying a second output voltage pulse train from the second DC voltage source to the load in such a manner to form a pulse continuous in time in the final output voltage at least from each pulse of the first output voltage pulse train and a subsequent pulse of the second output voltage pulse train,
wherein the power-converter control unit is configured to perform the following:
computing a voltage correction value for each of the DC voltage sources based on values of the output voltages of the DC voltage sources and the sign of an associated phase current value; and
correcting a voltage command value allocated to each of the DC voltage sources by adding the voltage correction value.

13. The electric power conversion apparatus as claimed in claim 12, wherein the power-converter control unit is configured to perform the following:
computing a basic voltage correction value for each of the DC voltage sources based on a length of a short-circuit prevention period provided to prevent a short circuit, a frequency of the PWM pulse trains, and the values of the output voltages of the DC voltage sources;
setting the voltage correction value to a positive value corresponding to the basic voltage correction value for each of the DC voltage sources when the sign of the associated phase current value is positive;
setting the voltage correction value to the positive value corresponding to the basic voltage correction value for one of the DC voltage sources whose output voltage is higher when the sign of the associated phase current value is negative;
setting the voltage correction value to a negative value corresponding to the basic voltage correction value for one of the DC voltage sources whose output voltage is lower when the sign of the associated phase current value is negative; and
correcting the voltage command value of each of the DC voltage sources by adding the computed voltage correction value.

14. The electric power conversion apparatus as claimed in claim 12, wherein the power-converter control unit is configured to perform the following:
setting the voltage correction value for each of the DC voltage sources to a predetermined value in accordance with the sign of the associated phase current value and a relationship in magnitude between the output voltages of the DC voltage sources; and correcting the voltage command value of each of the DC voltage sources by adding the set voltage correction value.

15. The electric power conversion apparatus as claimed in claim 12, wherein the power-converter control unit is configured to perform the following:

computing a basic modulation factor correction value for each of the DC voltage sources based on the values of the output voltages of the DC voltage sources and the sign of the associated phase current value, a length of a short-circuit prevention period provided to prevent a short circuit, and a frequency of the PWM pulse trains;

setting a modulation factor correction value to a positive value corresponding to the basic modulation factor correction value for each of the DC voltage sources when the sign of the associated phase current value is positive;

setting the modulation factor correction value to the positive value corresponding to the basic modulation factor correction value for one of the DC voltage sources whose output voltage is higher when the sign of the associated phase current value is negative;

setting the modulation factor correction value to a negative value corresponding to the basic modulation factor correction value for one of the DC voltage sources whose output voltage is lower when the sign of the associated phase current value is negative; and correcting a modulation factor command value allocated to each of the DC voltage sources by adding the computed modulation factor correction value, the modulation factor command value being a value obtained by normalizing the voltage command value of each of the DC voltage sources by the value of the output voltage of each of the DC voltage sources.

16. The electric power conversion apparatus as claimed in claim 12, wherein the power-converter control unit is configured to perform the following:

setting a modulation factor correction value for each of the DC voltage sources to a predetermined positive value when the sign of the associated phase current value is positive;

setting the modulation factor correction value for one of the DC voltage sources whose output voltage is higher to the predetermined positive value when the sign of the associated phase current value is negative;

setting the modulation factor correction value for one of the DC voltage sources whose output voltage is lower to a predetermined negative value when the sign of the associated phase current value is negative; and correcting a modulation factor command value allocated to each of the DC voltage sources by adding the computed modulation factor correction value, the modulation factor command value being a value obtained by normalizing the voltage command value of each of the DC voltage sources by the value of the output voltage of each of the DC voltage sources.

* * * * *